US009602565B2

United States Patent
Fujita et al.

(10) Patent No.: US 9,602,565 B2
(45) Date of Patent: Mar. 21, 2017

(54) VIDEO PROCESSING SYSTEM, VIDEO CONTENT MONITORING METHOD, VIDEO PROCESSING APPARATUS, CONTROL METHOD OF THE APPARATUS, AND STORAGE MEDIUM STORING CONTROL PROGRAM OF THE APPARATUS

(75) Inventors: Naotake Fujita, Tokyo (JP); Toshiyuki Nomura, Tokyo (JP); Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 456 days.

(21) Appl. No.: 14/007,174

(22) PCT Filed: Jan. 30, 2012

(86) PCT No.: PCT/JP2012/051926
§ 371 (c)(1),
(2), (4) Date: Sep. 24, 2013

(87) PCT Pub. No.: WO2012/132532
PCT Pub. Date: Oct. 4, 2012

(65) Prior Publication Data
US 2014/0019594 A1 Jan. 16, 2014

(30) Foreign Application Priority Data
Mar. 25, 2011 (JP) ................................ 2011-067641

(51) Int. Cl.
*G06F 15/16* (2006.01)
*H04L 29/06* (2006.01)
(Continued)

(52) U.S. Cl.
CPC ........ *H04L 65/60* (2013.01); *G06F 17/30849* (2013.01); *H04N 21/23418* (2013.01);
(Continued)

(58) Field of Classification Search
CPC ........... G06K 9/00751; G06K 9/00758; G06K 9/00765; G06K 9/00744; G06K 9/00711; G06K 9/00624; H04N 5/913
See application file for complete search history.

(56) References Cited

U.S. PATENT DOCUMENTS

2008/0162577 A1 7/2008 Fukuda et al.
2009/0148058 A1* 6/2009 Dane ...................... H04N 5/145
382/251
(Continued)

FOREIGN PATENT DOCUMENTS

JP 2005-18674 A 1/2005
JP 2006-285907 A 10/2006
(Continued)

OTHER PUBLICATIONS

Sen-Ching Samson Cheung et al., "Efficient Video Similarity Measurement With Video Signature", IEEE Transactions on Circuits and Systems for Video Technology, vol. 13, No. 1, Jan. 2003, XP-001142854, pp. 59-74.
Nevenka Dimitrova, et al., "Content-Based Video Retrieval by Example Video Clip", Proceedings of SPIE vol. 3022, Jan. 15, 1997, pp. 59-70.
(Continued)

*Primary Examiner* — Nam Tran

(57) ABSTRACT

A system of this invention is a video processing system for determining details of a browsable video content. This video processing system includes a video fragment download unit that downloads data of a video fragments in a determination target video content via a network, and a first video content determination unit that determines the details of the video content based on the downloaded data of the video fragments. With this arrangement, it is possible to determine the details of a browsable video content while reducing the amount of data to be downloaded.

34 Claims, 34 Drawing Sheets

(51) Int. Cl.
*H04N 21/845* (2011.01)
*H04N 21/254* (2011.01)
*H04N 21/234* (2011.01)
*H04N 21/2743* (2011.01)
*H04N 21/658* (2011.01)
*G06F 17/30* (2006.01)

(52) U.S. Cl.
CPC ..... *H04N 21/2541* (2013.01); *H04N 21/2743* (2013.01); *H04N 21/6582* (2013.01); *H04N 21/8456* (2013.01)

(56) References Cited

U.S. PATENT DOCUMENTS

| | | | | |
|---|---|---|---|---|
| 2009/0175538 | A1* | 7/2009 | Bronstein | G06K 9/00758 382/173 |
| 2010/0049711 | A1* | 2/2010 | Singh | G06K 9/00758 707/758 |
| 2010/0071016 | A1* | 3/2010 | Uhm | G06K 9/00758 725/114 |
| 2010/0085481 | A1* | 4/2010 | Winter | G06K 9/00711 348/513 |
| 2010/0299353 | A1 | 11/2010 | Kodate et al. | |
| 2011/0051810 | A1* | 3/2011 | Oami | G06K 9/00711 375/240.08 |

FOREIGN PATENT DOCUMENTS

| | | |
|---|---|---|
| JP | 2008-166914 A | 7/2008 |
| JP | 2009-70349 A | 4/2009 |
| WO | 2009/035032 A1 | 3/2009 |
| WO | 2010/084714 A1 | 7/2010 |

OTHER PUBLICATIONS

Rainer Lienhart et al., "VisualGREP: A Systematic Method to Compare and Retrieve Video Sequences", Proceedings of SPIE vol. 3312, XP-002728105, Dec. 23, 1997, pp. 271-282.
The Extended European Search Report of EP Application No. 12763284.2 dated on Aug. 13, 2014.
Nobuyuki Araki et al., "Doga content o Anteiteki Katsu Anzen ni Haishinnsuru Hoshikini Kansuru Ichi Kosatsu" Proceedings of the 67th National Meeting of Information Processing Society of Japan, separate vol. 3, Information Processing Society of Japan, Mar. 2, 2005, pp. 3-93 to 3-94.
Yasuhiro Satake et al., "Infringements and Troubles in the Digital Content Delivery and Content Tracking System for Digital Rights Management", IEICE Technical Report, Jun. 21, 2002, vol. 102, No. 138, pp. 19-24 ISSN:0913-5685.
Yuichiro Katsuda, "Eizo Shikiabetsu Gijutsu", I/O, Jul. 1, 2010, vol. 35, No. 7, pp. 97-99, ISSN:0387-6675.
Brasnett, P., et al., "Recent developments on standardization of MPEG-7 Visual Signature Tools"., Proc.of IEEE Int. Conf. on Multimedia and Expo, ICME 2010, Jul. 2010, pp. 1347-1352. ISBN: 978-1-4244-7491-2.
Go Ohtake et al., "A method combining Characteristic Information Extraction and Phase-Only Correlation to Identify Pirated Video Content", The Journal of the Institute of Image Information and Television Engineers, Aug. 1, 2008, vol. 62, No. 8, pp. 1292-1300, ISSN:1342-6907.
Heng Tao Shen, et al., "Effective and Efficient Query Processing for Video Subsequence Identification", IEEE Transactions on Knowledge and Data Engineering, Mar. 2009, vol. 21, No. 3, pp. 321-334, ISSN:1041-4347.
International Search Report for PCT Application No. PCT/JP2012/051926 mailed on Feb. 28, 2012.

* cited by examiner

FIG. 5

| | 501 | 502 | 503 | 504 | 505 |
|---|---|---|---|---|---|
| 441 | VIDEO CONTENT NAME (ID) | TYPE | STORAGE SIZE | DOWNLOAD SOURCE (URL) | TIME LENGTH (TIME) |
| | AAA(1001) | MOVIE | 1.1Mbyte | Http://www.aa@··· | 3:00 |
| | BBB(2010) | SPORT | 2.0Mbyte | Http://www.bb@··· | 5:45 |
| | ··· | | | | |

| TYPE 601 | TIME INTERVAL 602 | NUMBER OF VIDEO FRAGMENTS 603 | OFFSET 604 | VIDEO FRAGMENT LENGTH 605 |
|---|---|---|---|---|
| TV DRAMA | | | | |
| MOVIE | | | | |
| DOCUMENTARY | | | | |
| SPORT | | | | |
| ... | | | | |
| UNKNOWN | | | | |

| VIDEO CONTENT ID | VIDEO FRAGMENT SN | VIDEO FRAGMENT START | VIDEO FRAGMENT END |
|---|---|---|---|
| AAA(1001) | 001 | | |
| | ... | | |
| BBB(2010) | 001 | | |
| | ... | | |

| VIDEO CONTENT ID (801) | VIDEO FRAGMENT SN (802) | VIDEO FRAGMENT START (803) | VIDEO FRAGMENT END (804) | DETERMINED RESULT (VIDEO CONTENT ID) (805) |
|---|---|---|---|---|
| AAA(1001) | 001 | | | aaa(0002) |
| | ... | | | aaa(0002) |
| BBB(2010) | xxx | | | NO MATCHING |
| | 001 | | | |
| | ... | | | |

447

| VIDEO CONTENT NAME (ID) | PRODUCER | PRODUCED DATE/TIME | VIDEO CONTENT DATA |
|---|---|---|---|
| aaa(0002) | ABCD | 19981225 | |
| bbb(0004) | WXYZ | 20010911 | |
| ... | | | |

FIG. 9

| VIDEO FRAGMENT SELECTION ALGORITHM | SUBSTANCE OF ALGORITHM |
|---|---|
| A-1 | VIDEO CONTENT IS DIVIDED INTO n SEGMENTS, AND OFFSETS ARE SELECTED AT RANDOM (VIDEO FRAGMENT LENGTH IS CONTENT LENGTH: T/n OR LESS) |
| A-2 | VIDEO CONTENT IS DIVIDED AT PREDETERMINED TIME INTERVAL (T0), AND OFFSETS ARE SELECTED AT RANDOM (VIDEO FRAGMENT LENGTH IS T0 OR LESS) |
| A-3 | VIDEOS FOR PREDETERMINED TIME AT START AND END OF VIDEO CONTENT ARE DELETED |
| ... | |
| B-1 | PLURALITY OF SEGMENTS EFFECTIVE FOR DETERMINATION ARE PREPARED, AND SEGMENTS ARE SELECTED AT RANDOM |
| ... | |

FIG. 12B

| TYPE | DETAILS | VIDEO FRAGMENT SELECTION ALGORITHM | OTHER ALGORITHM(S) |
|---|---|---|---|
| TV DRAMA | KNOWN | B-1 | A-3 |
| MOVIE | KNOWN | B-1 | |
| DOCUMENTARY | UNKNOWN | A-2 | |
| SPORT | UNKNOWN | A-1 | A-3 |
| ... | | | |
| UNKNOWN | UNKNOWN | A-1 | |

FIG. 17

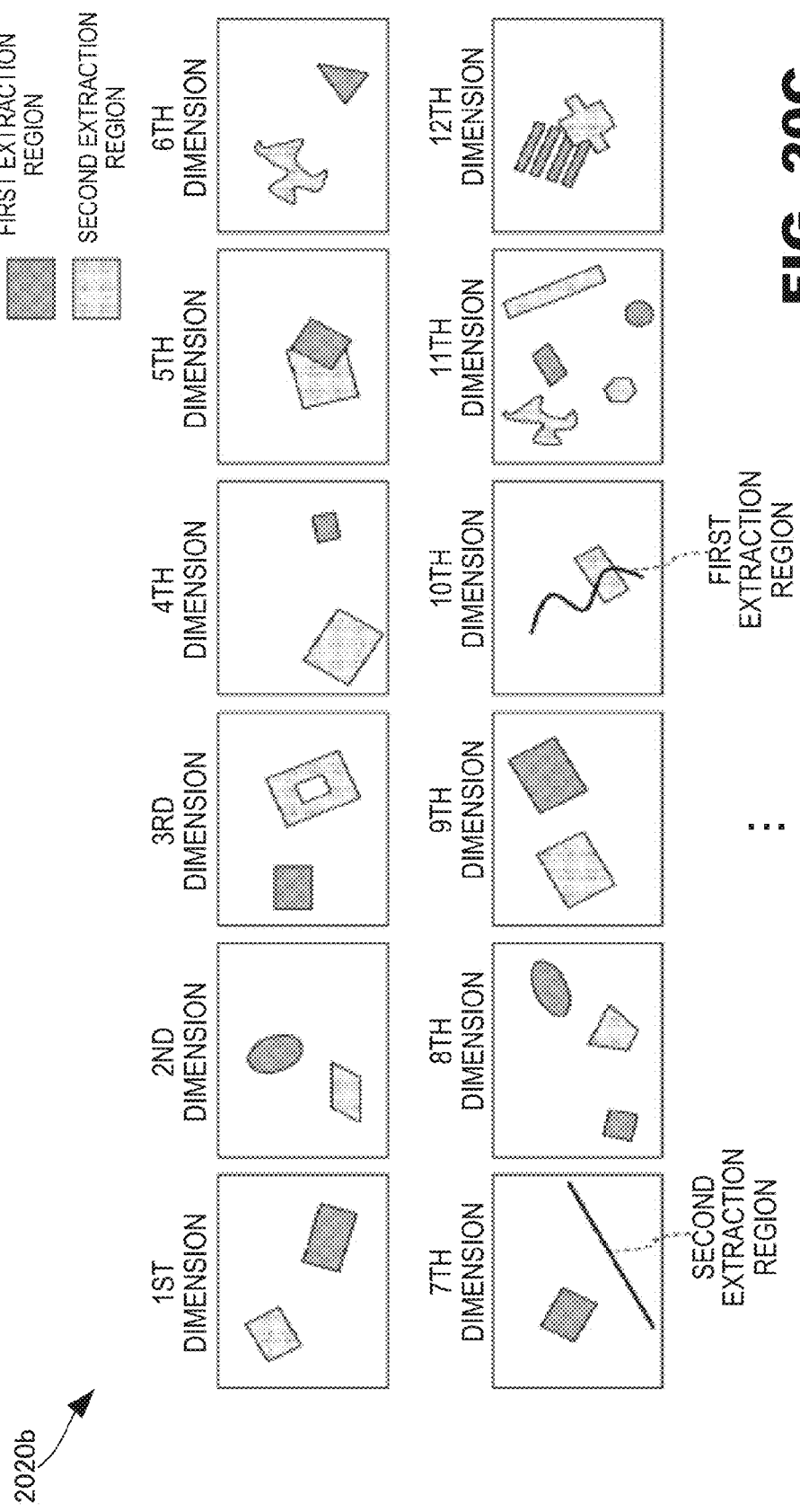

| VIDEO CONTENT ID 3001 | FRAME FEATURE SEQUENCE 3002 | MATCHING/ UNMATCHING 3003 | VIDEO FRAGMENT SN 3004 | FRAME FEATURE SEQUENCE 3005 | DETERMINED RESULT (VIDEO CONTENT ID/ SCENE ID) 3006 | ASSOCIATED VIDEO CONTENT ID/ SCENE ID 3007 | MATCHING/ UNCERTAINTY/ UNMATCHING 3008 | ILLEGALITY 3009 |
|---|---|---|---|---|---|---|---|---|
| AAA(1001) | — | — | 001 | | aaa(0002)/SCENE 03 | nnn(0010)/SCENE 13 | MATCH | PRESENT |
| | | | ... | | | | | |
| | | | xxx | | aaa(0002)/SCENE 35 | zzz(1121)/SCENE 51 | MATCH | |
| BBB(2010) | | UNMATCHING | 001 | | NO MATCHING | | UNCERTAIN | ABSENT |
| | | | ... | | | | | |

FIG. 30

VIDEO PROCESSING SYSTEM, VIDEO CONTENT MONITORING METHOD, VIDEO PROCESSING APPARATUS, CONTROL METHOD OF THE APPARATUS, AND STORAGE MEDIUM STORING CONTROL PROGRAM OF THE APPARATUS

This application is a National Stage Entry of PCT/JP2012/051926 filed Jan. 30, 2012, which claims priority from Japanese Patent Application 2011-067641 filed Mar. 25, 2011, the contents of all of which are incorporated herein by reference, in their entirety.

TECHNICAL FIELD

The present invention relates to a technique of monitoring the details of a generated video content.

BACKGROUND ART

In the above-described technical field, patent literature 1 discloses a technique of causing a collation server to collate browsing moving image data uploaded from a client to a site with moving image data already registered by a registrant, as shown in FIG. 1, thereby determining whether the moving image data can be uploaded. Also mentioned is speeding up the processing by causing the collation server to do the collation for a still image group extracted arbitrarily or at random (see paragraphs [0045] and [0046]). It is also suggested that when browsing moving image data is uploaded directly from a client to a site, a reference server acquires the browsing moving image data from the site and collates it (see paragraph [0031]).

CITATION LIST

Patent Literature

Patent literature 1: Japanese Patent Laid-Open No. 2009-070349

SUMMARY OF THE INVENTION

Technical Problem

In the technique described in this literature, however, even when the browsing moving image data is uploaded directly from the client to the site, and the reference server acquires the browsing moving image data from the site and collates it, still images are extracted upon collation at the reference server. Hence, the enormous amount of browsing moving image data is directly sent from the site to the reference server. Especially in an open system that connects a plurality of sites to the network, the reference server is demanded to take the initiative in collecting the browsing moving image data to be collated and performing the collation processing. However, collecting (downloading) the browsing moving image data to be collated is time-consuming.

The present invention enables to provide a technique of solving the above-described problem.

Solution to Problem

One aspect of the present invention provides a video processing system for determining details of a browsable video content, comprising:

a video fragment download unit that downloads data of a video fragments in a determination target video content via a network; and a first video content determination unit that determines the details of the video content based on the downloaded data of the video fragments.

Another aspect of the present invention provides a video content monitoring method of determining details of a browsable video content, comprising:

selecting a target video content of which details should be determined from video contents uploaded to a video content distribution site;

downloading data of a video fragments including one frame in the video content, a series of a plurality of frames, or a discrete set of at least one frame within a predetermined time in the selected video content via a network; and determining, based on comparison between a frame feature extracted from each frame of the downloaded video fragments and frame features of a video content registered in advance, whether a video scene formed from a series of a plurality of frames including the video fragments matches a video scene of the video content registered in advance or a video content including the video fragments matches the video content registered in advance.

Still other aspect of the present invention provides a video processing apparatus for determining details of a browsable video content, comprising:

a video content selector that selects a video content of which details should be determined from video contents uploaded to a video content distribution site;

a video fragment download unit that downloads data of a video fragments including one frame in the video content, a series of a plurality of frames, or a discrete set of at least one frame within a predetermined time in the selected video content via a network; and a video content determination unit that determines the details of the video content based on the downloaded data of the video fragments.

Still other aspect of the present invention provides a control method of a video processing apparatus for determining details of a browsable video content, comprising:

selecting a video content of which details should be determined from video contents uploaded to a video content distribution site;

downloading data of a video fragments including one frame in the video content, a series of a plurality of frames, or a discrete set of at least one frame within a predetermined time in the selected video content via a network; and determining the details of the video content based on the downloaded data of the video fragment.

Still other aspect of the present invention provides a computer-readable storage medium storing a control program of a video processing apparatus for determining details of a video content, the control program causing a computer to execute:

selecting a video content of which details should be determined from video contents uploaded to a video content distribution site;

downloading data of a video fragments including one frame in the video content, a series of a plurality of frames, or a discrete set of at least one frame within a predetermined time in the selected video content via a network; and determining the details of the video content based on the downloaded data of the video fragments.

Advantageous Effects of Invention

According to the present invention, it is possible to determine details of a browsable video content while reducing the amount of data to be downloaded.

BRIEF DESCRIPTION OF THE DRAWINGS

FIG. 5 is a view showing the arrangement of a target video content list according to the second embodiment of the present invention;

FIG. 6 is a view showing the arrangement of a video fragment parameter table according to the second embodiment of the present invention;

FIG. 7 is a view showing the arrangement of a video fragment selection list according to the second embodiment of the present invention;

FIG. 8 is a view showing the arrangement of a determined result list of target video contents according to the second embodiment of the present invention;

FIG. 9 is a view showing the arrangement of a video content DB according to the second embodiment of the present invention;

FIG. 12B is a view showing a video fragment selection algorithm according to the second embodiment of the present invention;

FIG. 17 is a view showing the arrangement of an algorithm selection table according to the fourth embodiment of the present invention;

FIG. 20C is a view showing the extraction regions of the frame feature extractor according to the fifth embodiment of the present invention;

FIG. 30 is a view showing the arrangement of a illegality determined result list of target video contents according to the eighth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Note that in this specification, the following words will be used. "Video content" indicates a video compiled as one work. "Video fragment" is a concept including one frame, a series of a plurality of frames, or a discrete set of at least one frame within a predetermined time, in a video content. "Video scene" indicates a series of a plurality of frames including at least one video fragment, included in a video content. "Download" and "upload" are not strictly used for storing and downloading/uploading data but also used even for temporary data transfer.

[First Embodiment]

A video processing system 100 according to the first embodiment of the present invention will be described with reference to FIG. 1. The video processing system 100 is a system for determining the details of a browsable video content.

Figure 1:
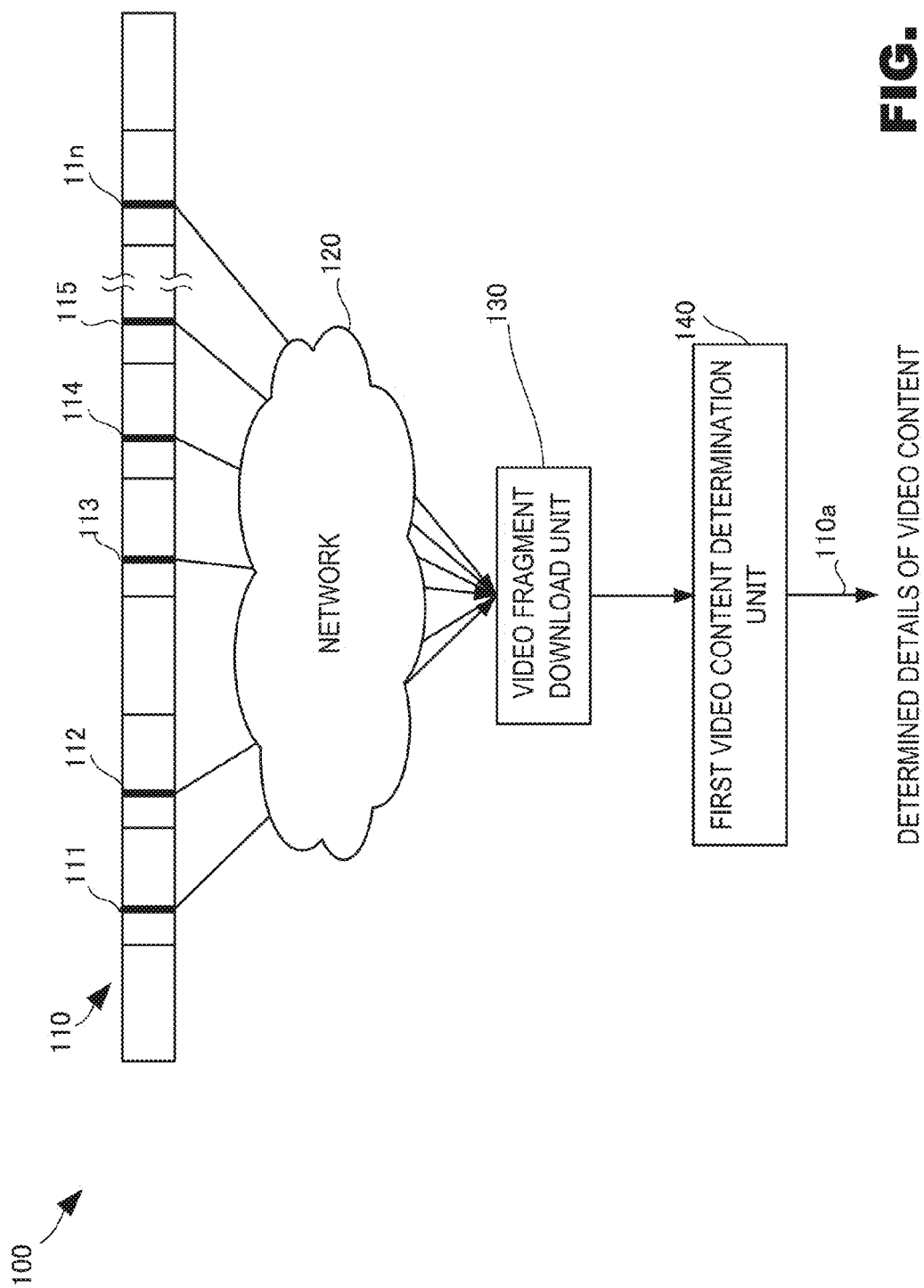
FIG. 1 is a block diagram showing the arrangement of a video processing system according to the first embodiment of the present invention.

As shown in FIG. 1, the video processing system 100 includes a video fragment download unit 130 and a first video content determination 140. The video fragment download unit 130 downloads, via a network 120, the data of video fragments 111 to 11n including a series of a plurality of frames in a determination target video content 110. The first video content determination 140 determines the details of the video content 110 based on the downloaded data of the video fragments 111 to 11n.

According to this embodiment, it is possible to determine the details of a browsable video content while reducing the amount of data to be downloaded.

[Second Embodiment]

A video processing system according to the second embodiment of the present invention will be described next. In the second embodiment, video fragments of a newly uploaded video content are downloaded from a video content distribution site via a network. The details of the newly uploaded video content are determined, thereby monitoring the video content. According to this embodiment, it is possible to determine the details of a newly uploaded video content while reducing the amount of data to be downloaded.

<Arrangement of Video Processing System>

Figure 2:
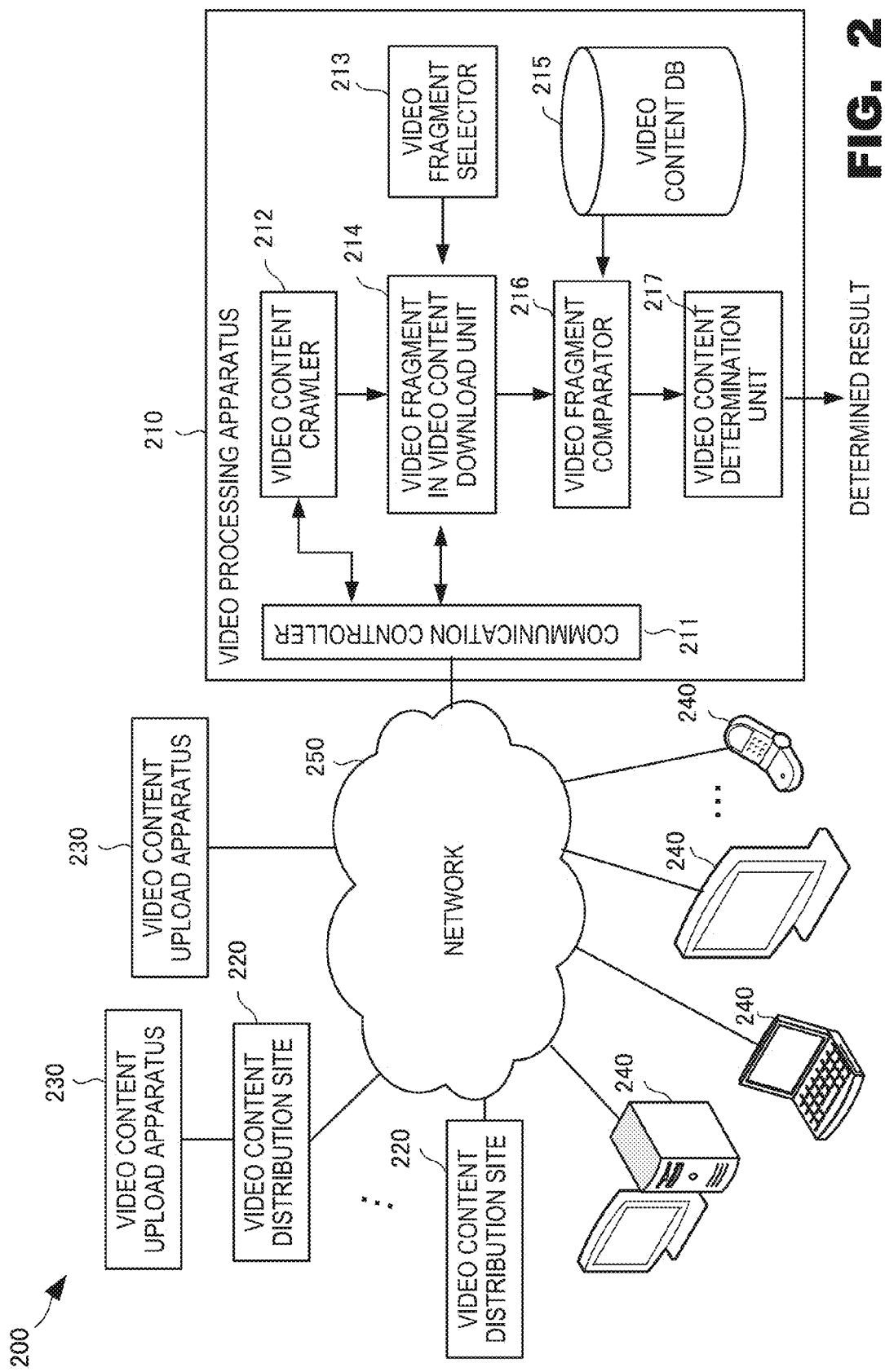
FIG. 2 is a block diagram showing the arrangement of a video processing system according to the second embodiment of the present invention.

FIG. 2 is a block diagram showing the arrangement of the video processing system according to the second embodiment of the present invention.

Referring to FIG. 2, a video processing apparatus 210 collects video fragments from video content distribution sites 220 via a network 250 and determines the details of video contents. The video content distribution sites 220 distribute video contents uploaded from video content upload apparatuses 230 to video content viewing terminals 240. Note that the video contents themselves can be present in the video content distribution sites 220, the video content upload apparatuses 230, or other distribution video content storages (not shown). The video content upload apparatuses 230 upload video contents to the video content distribution sites 220. FIG. 2 illustrates a video content upload apparatus that uploads a video content to the video content distribution site 220 via the network 250 and video content upload apparatus that locally uploads a video content to the video content distribution site 220. Note that the video content viewing terminals 240 may have the function of the video content upload apparatus 230. The video content viewing terminals 240 are devices having a function of downloading a video content from the video content distribution site 220 and viewing it, and include a desktop personal computer (to be referred to as a PC hereinafter), a notebook PC, a monitor, and a mobile phone, as shown in FIG. 2.

The video processing apparatus 210 of this embodiment includes the following functional components. A communication controller 211 controls communication with the video content distribution sites 220 via the network 250. A video content crawler 212 searches the plurality of video content distribution sites 220 connected to the network 250 for the storage location of a newly registered video content via the communication controller 211. A video fragment selector 213 selects video fragments to be downloaded out of the video content that is found by the video content crawler 212 as a video content whose details should be determined. In this embodiment, the video fragments are selected by a predetermined method. A video fragment in video content download unit 214 extracts and downloads, via the communication controller 211, the video fragments selected by the video fragment selector 213 from each video content of which details should be determined. A video content DB (database) 215 accumulates known/existing video contents to be compared with the video fragments of the video content whose details should be determined. A video fragment comparator 216 sequentially compares the video fragments downloaded from the video content distribution site 220 by the video fragment in video content download unit 214 with the known/existing video contents accumulated in the video content DB 215. A video content determination unit 217 determines, based on the result of comparison between the downloaded video fragments and the video contents accumulated in the video content DB 215 by the video fragment comparator 216, whether the video content of which details should be determined matches all or some of the accumulated video contents, and outputs the determined result. The matching and determination are done on condition of the distinctive parts matching, the total matching ratio or the matching degree of matching parts.

<Operation Procedure of Video Processing System>

Figure 3:
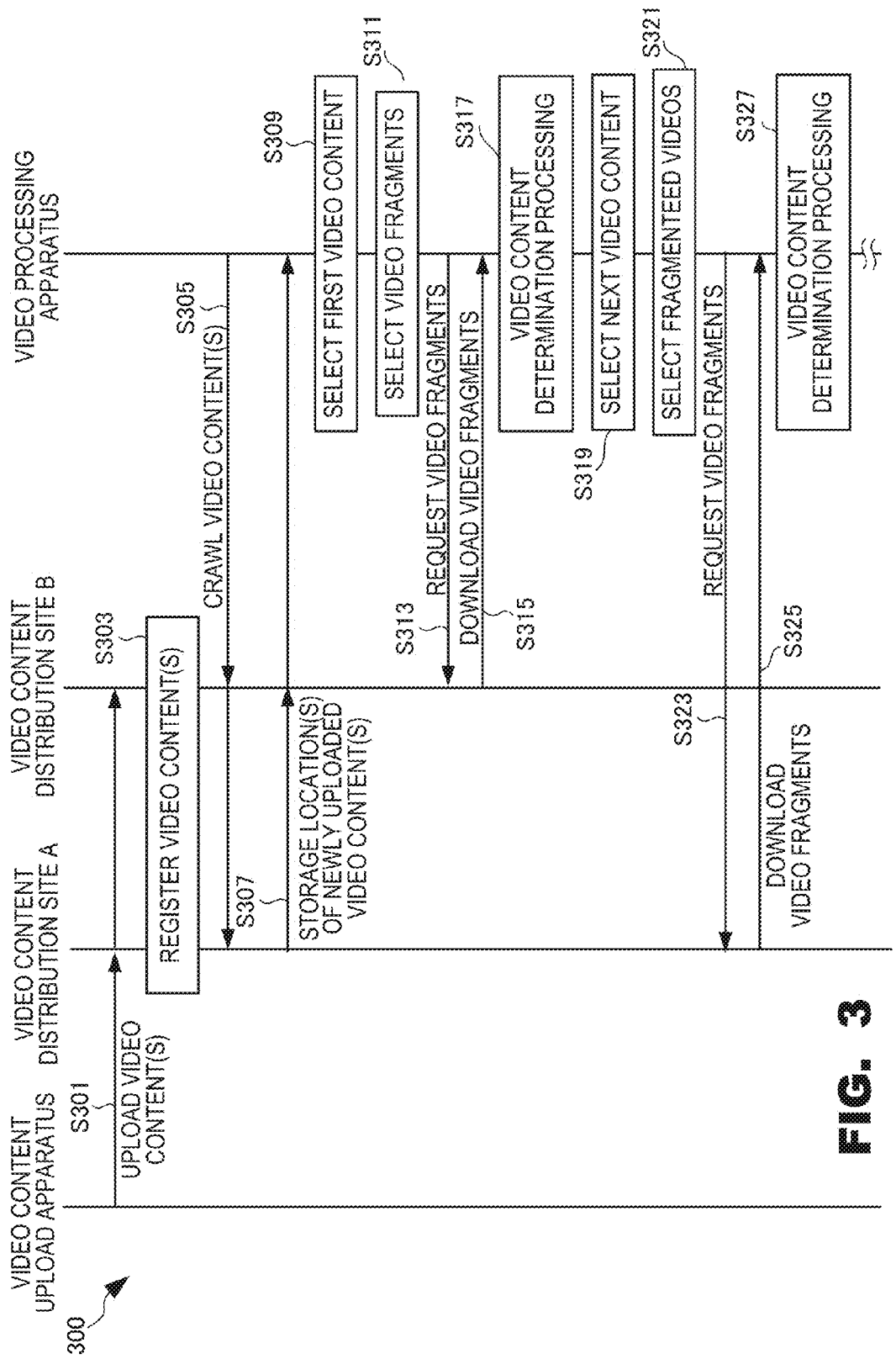
FIG. 3 is a sequence chart showing the operation procedure of the video processing system according to the second embodiment of the present invention.

FIG. 3 is a sequence chart showing an operation procedure 300 of the video processing system according to this embodiment. Note that in FIG. 3, video content distribution sites A and B are provided so as to clarify a method (called a depth method) of sequentially completing determination of individual video contents.

In step S301, the video content upload apparatus uploads one or more video contents to the video content distribution sites. In step S303, video content registration processing is performed in the video content distribution sites A and B.

In step S305, the video processing apparatus executes video content crawling at a predetermined timing. Note that the crawling can be performed at a predetermined time interval or at a timing decided by the number of new video contents registered or accumulated in the video content distribution sites. In step S307, the storage locations of newly uploaded video contents, which are the results of crawling, are reported to the video processing apparatus.

In step S309, the video processing apparatus selects the first video content to be determined. Note that the video contents can be selected in an arbitrary order, for example, the order of video content uploaded time. In step S311, the positions of video fragments to be downloaded are selected in the video content. Several examples of the video fragment position selection will be described later with reference to FIG. 12. In step S313, the video processing apparatus requests to download the selected video fragments from the video content distribution site. FIG. 3 assumes that the first video content exists in the video content distribution site B. In step S315, the requested video fragments are downloaded from the video content distribution site B to the video processing apparatus via the network. In step S317, determination processing is performed by sequentially comparing the downloaded video fragments with the video contents in the video content DB and determining whether the video contents match wholly or partially.

In step S319, the video processing apparatus selects the next video content to be determined. In step S321, the positions of video fragments to be downloaded are selected in the video content. In step S323, the video processing apparatus requests the selected video fragments from the video content distribution site. FIG. 3 assumes that the next video content exists in the video content distribution site A. In step S325, the requested video fragments are downloaded from the video content distribution site A to the video processing apparatus via the network. In step S327, determination processing is performed by sequentially comparing the downloaded video fragments with the video contents in the video content DB and determining whether the video contents match wholly or partially.

Note that reduction of the amount of video fragments to be downloaded and speedup of the processing can be achieved depending on the number of video fragments, by sequentially processing a predetermined number of video fragments but stopping the processing upon matching establishment, instead of processing all video fragments at once, in the above-described video fragment request, video fragment download, and video content determination processing. The determination processing result representing whether the video contents match wholly or partially may be notified by the video processing apparatus, or informed from the video processing apparatus to the video content distribution sites, the video content upload apparatuses, or the video viewing terminals.

<Hardware Arrangement of Video Processing Apparatus>

Figure 4:
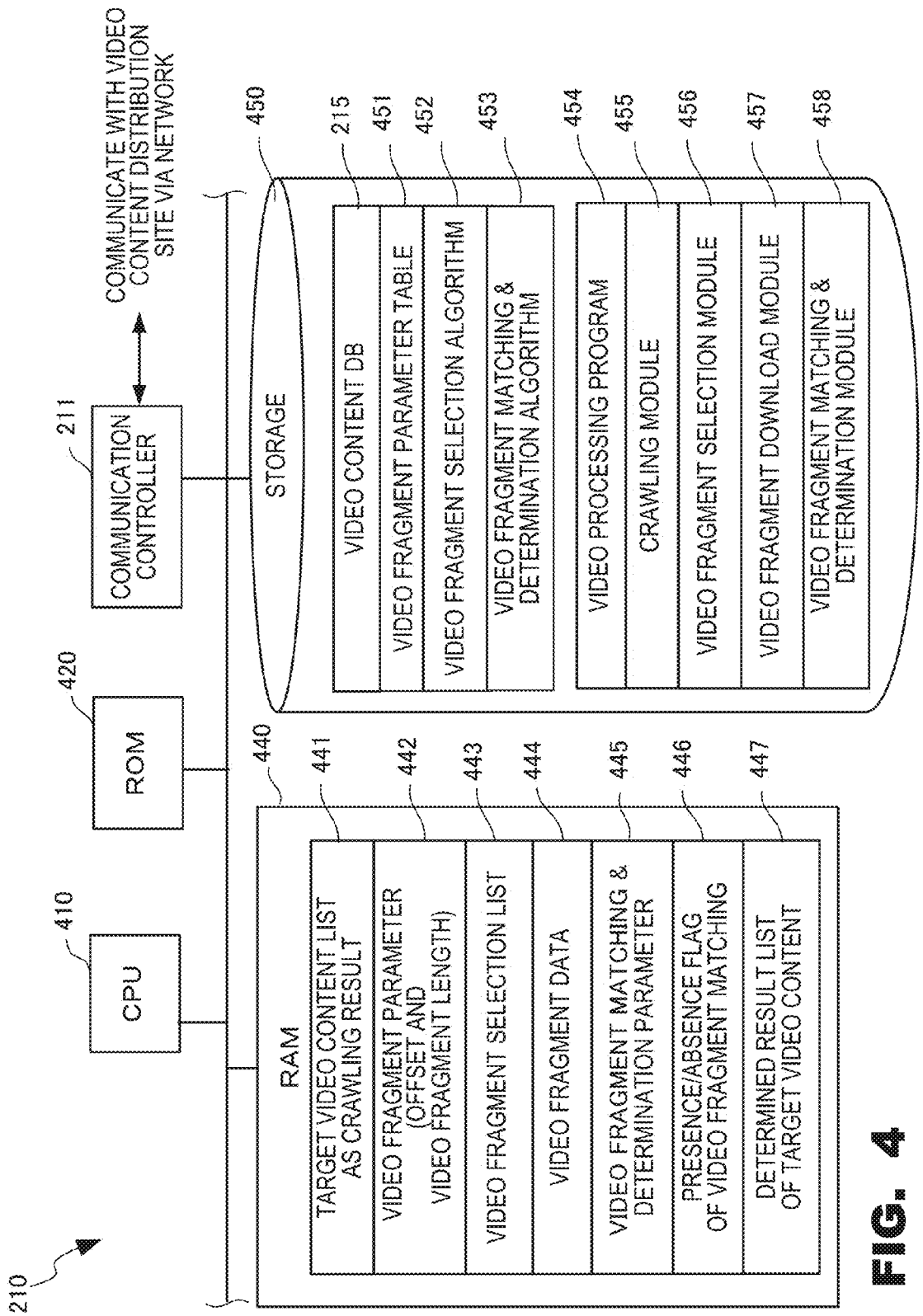
FIG. 4 is a block diagram showing the hardware arrangement of a video processing apparatus according to the second embodiment of the present invention.

FIG. 4 is a block diagram showing the hardware arrangement of the video processing apparatus 210 according to this embodiment.

Referring to FIG. 4, a CPU 410 is a processor for arithmetic control and implements each functional component shown in FIG. 2 by executing a program. A ROM 420 stores initial data, permanent data of programs and the like, and the programs. A communication controller 211 communicates with the video content distribution sites 220 via the video content viewing terminal. Communication can be either wireless or wired. Note that the communication controller 211 also communicates with the video content viewing terminals 240 as needed.

A RAM 440 is a random access memory used by the CPU 410 as a work area for temporary storage. An area to store data necessary for implementing the embodiment is allocated in the RAM 440. A target video content list 441 as crawling result is a list of newly uploaded details determination target video contents returned from the video content distribution site 220 as a result of crawling (see FIG. 5). A video fragment parameter 442 for video fragment position selection includes an offset, a video fragment length, and the like to be used to locate video fragments. A video fragment selection list 443 represents the positions of selected video fragments (see FIG. 7). Video fragment data 444 includes video fragment data downloaded from the video content distribution sites 220 via the communication controller 211. A video fragment matching and determination parameter 445 is used as a matching condition when comparing the downloaded video fragments with the accumulated video contents. A presence/absence flag 446 of video fragment matching represents the presence/absence of matching for each video fragment. A determined result list 447 of target video content represents, as the final determination, the result of determining using the video fragments whether a video content wholly or partially matching the video content including the video fragments is accumulated (see FIG. 8).

A storage 450 stores databases, various kinds of parameters, and following data and programs necessary for implementing the embodiment. Reference numeral 215 denotes the video content DB (see FIG. 9). A video fragment parameter table 451 is used as the video fragment parameter 442 (see FIG. 6). A video fragment selection algorithm 452 is an algorithm to select a video fragment (see FIG. 12B). A video fragment matching and determination algorithm 453 is an algorithm to judge matching of video fragments using the video fragment matching judgment parameter 445. The storage 450 stores the following programs. A video processing program 454 executes overall processing. A crawling module 455 executes crawling processing in the video processing program 454. A video fragment selection module 456 selects video fragments to be downloaded in the video processing program 454 (see FIGS. 11 and 12B). A video fragment download module 457 downloads the selected video fragments in the video processing program 454. A video fragment matching and determination module 458 determines matching between the video fragments and the accumulated video contents in the video processing program 454.

Note that FIG. 4 illustrates the data and programs indispensable in this embodiment but not general-purpose data and programs such as the OS.

(Arrangement of Target Video Content List)

FIG. 5 is a view showing the arrangement of the target video content list 441 according to this embodiment.

The target video content list 441 shown in FIG. 5 is the list of newly uploaded video contents collected by crawling. A type 502, a storage size 503, a download source URL 504, and a time length (time) 505 are stored in association with a video content name (ID) 501. Note that the data are not limited to those described above. The type 502 is used to decide video fragment parameters. The storage size 503 and the time length (time) 505 are used to decide video fragment selection positions. The download source URL 504 is used to download the video fragments. Note that the address of the download source is not limited to the URL.

(Arrangement of Video Fragment Parameter Table)

FIG. 6 is a view showing the arrangement of the video fragment parameter table 451 according to this embodiment. The video fragment parameters 442 according to the type of a video content are selected from the video fragment parameter table 451 and used to select fragments.

The video fragment parameter table 451 stores a time interval 602 of a video content, the number 603 of video fragments to be selected, an offset 604 representing a position in a divided time zone at which a video fragment should be set, and a video fragment length 605 in association with a type 601 of the video content. Note that the parameters are not limited to those described above. Although FIG. 6 shows a case in which the video fragments are managed by time, the video fragments may be managed by relative positions.

As the time interval 602, not one data but a plurality of data such as a first interval at the start, a second interval in the middle, and a third interval at the end may be stored. The number 603 of video fragments is associated with the time interval 602. To speed up the processing, control may be performed to limit the video fragments by the number 603 of video fragments and prohibit collection of video fragments from a predetermined number place. Conversely, keeping the time interval 602, the processing may be performed without limiting the video fragments by the number 603 of video fragments. To prevent the video fragments from being located periodically based on the time interval 602, random times are basically set using the offset 604 as an average. As the video fragment length 605 as well, not one data but different video fragment lengths are set for a video whose speed obviously changes depending on the time zone. The video fragment length 605 need not be fixed for a type and may change dynamically. For example, if frames to be compared are distinctive, and the reliability of the comparison result in matching determination is high, a predetermined video fragment length suffices as information for video content determination, and the video fragment length is not changed. On the other hand, if frames to be compared are less distinctive, the reliability of the comparison result in matching determination is low. Since a predetermined video fragment length is not sufficient as information for video content determination, adjustment is done to increase the video fragment length until reliable information is obtained. A frame including a person has a relatively high reliability, and a frame of landscape such as sky or sea has a relatively low reliability. Instead of designating the video fragment length 605, control may be done to obtain the video fragment length consequently in accordance with the obtained reliability. As described above, video fragment settings are done for the determination target video content in consideration of the determination speed and determination accuracy.

(Arrangement of Video Fragment Selection List)

FIG. 7 is a view showing the arrangement of the video fragment selection list 443 according to this embodiment. The video fragment selection list 443 stores information representing video fragments to be downloaded and collected from each determination target video content.

The video fragment selection list 443 stores a video fragment start 703 and a video fragment end 704 in association with a determination target video content ID 701 and a selected video fragment SN 702. The video fragment SN 702 is a serial number assigned to video fragments of each video content. Note that the data are not limited to those described above. The video fragment start 703 and the video fragment end 704 can be either times or positions. The video fragment start 703 and a video fragment length may also be used. The video fragment end 704 changes in accordance with the dynamically changing video fragment length, as described concerning the video fragment length 605 shown in FIG. 6. That is, if the reliability of the comparison result in matching determination is low, the video fragment end 704 is postponed until reliable information is obtained. If the video fragment length 605 is not set, the video fragment end 704 is not set either. The fragment end is decided when a reliable video fragment has been obtained.

(Arrangement of Video Fragment Content Determined Result List)

FIG. 8 is a view showing the arrangement of the video fragment content determined result list 447 according to this embodiment. In the video fragment content determined result list 447, a determined result that is a result obtained by comparing a video fragment with a video content in the video content DB and represents whether a video content partially matches the video fragment exists is added to the arrangement of the video fragment selection list 443. Note that a video content including video fragments can also be evaluated based on the determined result.

The video fragment content determined result list 447 stores a determined result 805 together with the ID of the matching video content in association with a video content ID 801, a video fragment SN 802, a video fragment start 803, and a video fragment end 804. In dynamic control as described concerning the video fragment end 704 shown in FIG. 7, the video fragment end 804 is blank at the beginning and set after a sufficiently reliable video fragment has been downloaded. Note that the data are not limited to those described above.

(Arrangement of Video Content DB)

FIG. 9 is a view showing the arrangement of the video content DB 215 according to this embodiment.

The video content DB 215 stores a producer 902, a production date/time 903, and video content data (or pointer) 904 in association with a known/existing video content name (ID) 901. Note that the data are not limited to those described above.

<Processing Procedure of Video Processing Apparatus>

Figure 10:
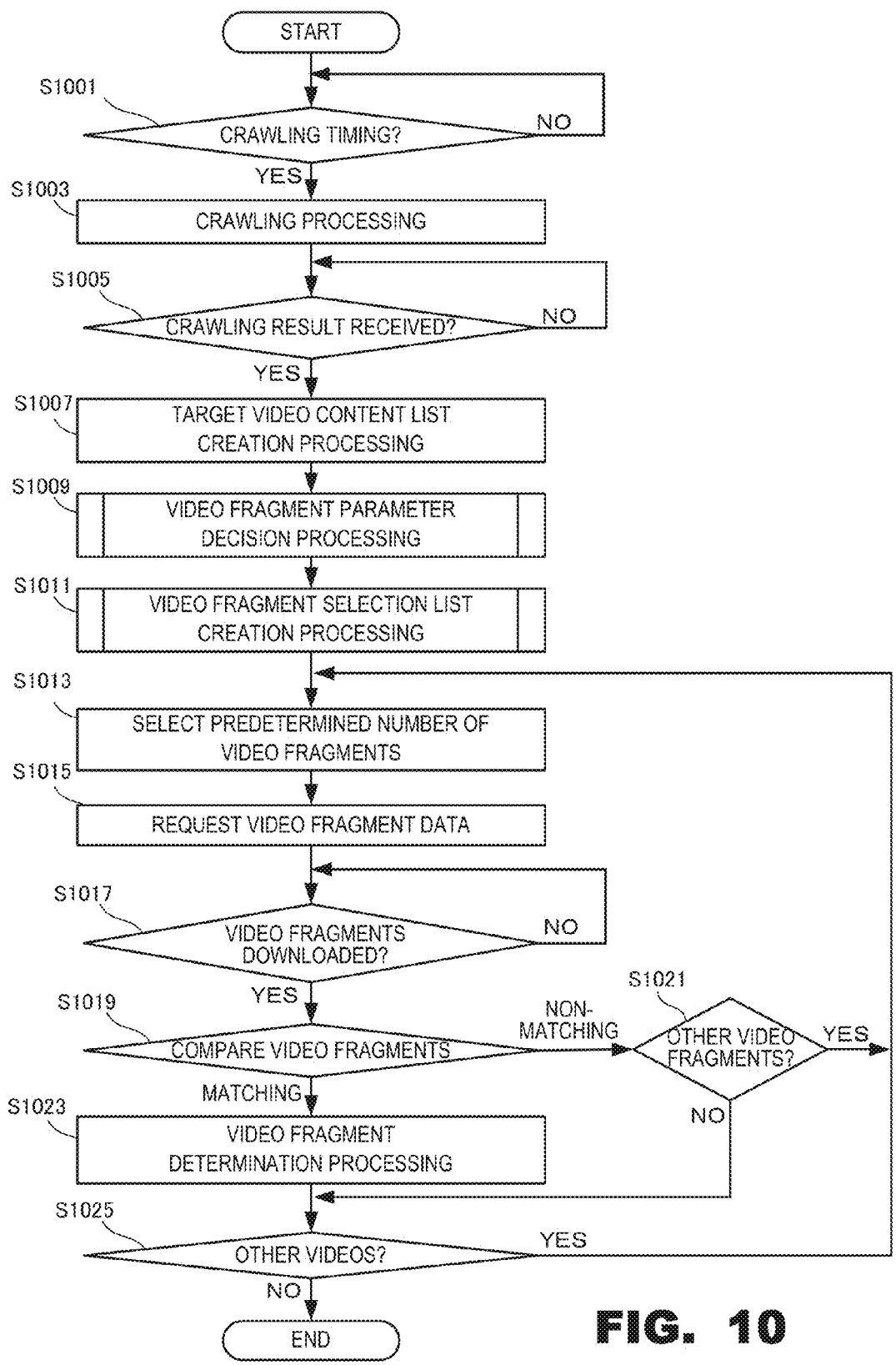
FIG. 10 is a flowchart showing the processing procedure of the video processing apparatus according to the second embodiment of the present invention.

FIG. 10 is a flowchart showing the processing procedure of the video processing apparatus 210 according to this embodiment. The CPU 410 of the video processing apparatus 210 executes this flowchart using the RAM 440, thereby implementing the functional components shown in FIG. 2.

In step S1001, the crawling timing is waited. When the crawling timing has come, the process advances to step S1003 to perform crawling processing for all video content distribution sites connected to the network. In step S1005, reception of a crawling result is waited. Upon receiving a crawling result, the process advances to step S1007 to create the target video content list 441 shown in FIG. 5.

Figure 11:
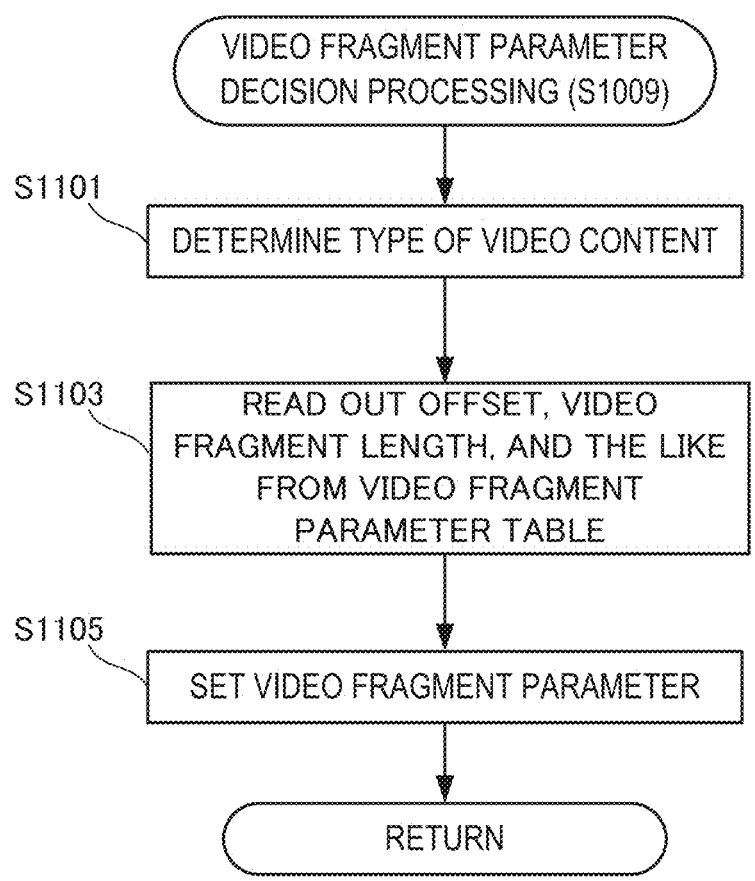
FIG. 11 is a flowchart showing the processing procedure of video fragment parameter decision processing according to the second embodiment of the present invention.
Figure 12A:
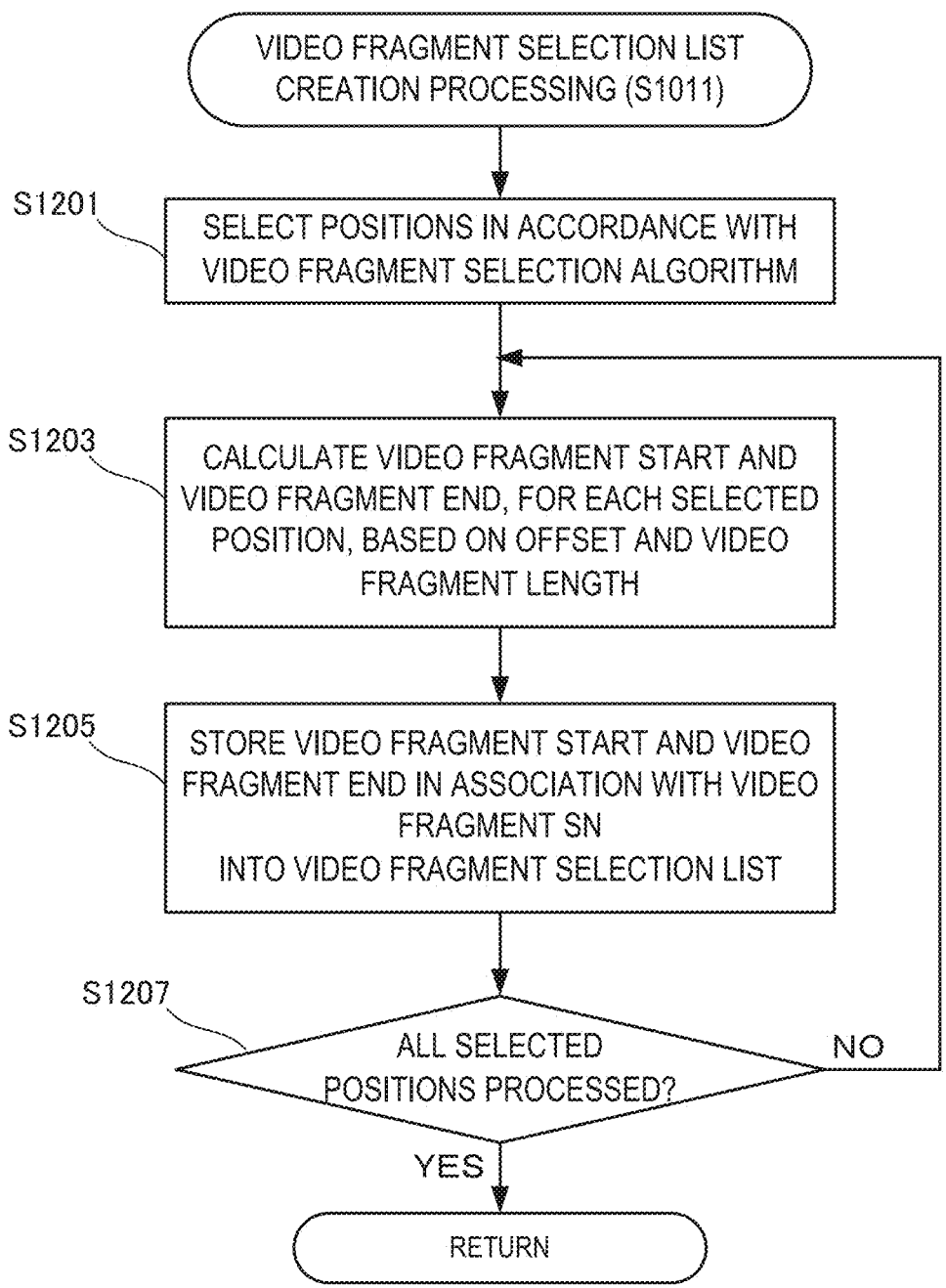
FIG. 12A is a flowchart showing the processing procedure of video fragment selection list creation processing according to the second embodiment of the present invention.

In step S1009, the video fragment parameters 442 (see FIG. 6) to select video fragments are decided (FIG. 11). In step S1011, the video fragment selection list 443 is created for each target video content (FIG. 12A). In step S1013, a predetermined number of video fragments are selected from the video fragment selection list 443. In step S1015, the data of the predetermined number of selected video fragments are requested from the video content distribution sites. In step S1017, download of the video fragments in response to the request is waited. If the video fragments are downloaded, the process advances to step S1019 to compare the video fragments with the video contents accumulated in the video content DB.

If no matching is obtained from the comparison result, it is judged in step S1021 whether video fragments to be compared exist yet. If video fragments to be compared exist, the process returns to step S1013 to repeat comparison of the video fragment. Upon judging in step S1021 that all video fragments have been compared, the process advances to step S1025.

On the other hand, if matching is obtained from the comparison result, the process advances to step S1023 to perform video fragment determination processing of determining whether matching of the video fragments can be regarded as matching of the video contents. In step S1025, it is judged whether other determination target video contents remain. If other determination target video contents remain, the process returns to step S1013 to repeat determination of the next video content. If no other determination target video content remains, the processing ends.

(Processing Procedure of Video Fragment Parameter Decision Processing)

FIG. 11 is a flowchart showing the processing procedure of video fragment parameter decision processing S1009 according to this embodiment.

In step S1101, the type of the determination target video content is determined. In step S1103, the offset, the video fragment length, and the like, which are set based on the type, are read out from the video fragment parameter table 451 in accordance with the determined type. In step S1105, the readout parameters are stored in the video fragment parameter 442.

(Processing Procedure of Video Fragment Selection List Creation Processing)

FIG. 12A is a flowchart showing the processing procedure of video fragment selection list creation processing S1011 according to this embodiment.

In step S1201, regions including video fragments are selected in accordance with the video fragment selection algorithm 452. In step S1203, the video fragment start and the video fragment end are calculated, for each selected region, based on the offset selected at random and the video fragment length. In step S1205, the video fragment start and the video fragment end are stored in association with the video content and the video fragment SN into the video fragment selection list 443. In step S1207, it is judged whether the video fragment position calculation has been done for all selected regions. If selected regions for which the calculation has not been done remain yet, the process returns to step S1203 to repeat the processing. Note that as described concerning FIG. 6, if no video fragment is necessary in all selected regions, the processes of steps S1203 and S1205 are ignored for the selected regions having no necessary video fragment.

FIG. 12B is a view showing the video fragment selection algorithm 452 according to this embodiment. In this embodiment, one video fragment selection algorithm 452 is used. Note that an example in which one video fragment selection algorithm is selected from a plurality of video fragment selection algorithms based on the type or details of a video content will be described later in detail in the fourth embodiment. In FIG. 12B, video fragment selection algorithms A-1 to A-3 are suitable when the details of a video content are unknown. A video fragment selection algorithm B-1 is suitable when the details of a video content are known. These video fragment selection algorithms are also used in combination in correspondence with a video content.

Referring to FIG. 12B, reference numeral 1201 denotes the video fragment selection algorithm A-1. In the video fragment selection algorithm A-1, a video content is segmented into n regions. A position where the offset is selected at random in the partial video content of the segmented region is set as a video fragment position. The video fragment length is T (video content length)/n or less.

Reference numeral 1202 denotes the video fragment selection algorithm A-2. In the video fragment selection algorithm A-2, a video content is segmented at a predetermined time interval (T0). A position where the offset is selected at random in the segmented region is set as a video fragment position. The video fragment length is T0 or less.

Reference numeral 1203 denotes the video fragment selection algorithm A-3. In the video fragment selection algorithm A-3, portions for a predetermined time before and after a video content are deleted. In, for example, a TV drama, these portions correspond to the commercial and title portions which are not regions characterizing the video content. The judgment of this processing can be done based on the video content type or preliminary video fragments. The video fragment selection algorithm A-1 or A-2 is applied to the remaining regions.

Reference numeral 1204 denotes the video fragment selection algorithm B-1. In the video fragment selection algorithm B-1, a plurality of regions assumed to be effective for determination are prepared, and a region is selected at random.

[Third Embodiment]

A video processing system according to the third embodiment of the present invention will be described next. The video processing system of this embodiment determines a video content with emphasis on the width, unlike the second embodiment in which the video content determination is performed with emphasis on the depth. Determination with emphasis on the width indicates processing of collecting a predetermined number of video fragments from all determination target video contents, performing comparison/determination, and excluding each video content determined as a matching video content at that point of time from the determination targets, instead of completing determination of video contents one by one and advancing to the next determination after completing determination. The arrangement and operation are the same as in the second embodiment except the sequence of the operation procedure of the video processing system and the flowchart of the processing procedure of the video processing apparatus, and a detailed description thereof will be omitted. According to this embodiment, it is possible to quickly determine a matching video content because final comparison of a non-matching video content need not be waited.

<Operation Procedure of Video Processing System>

Figure 13:
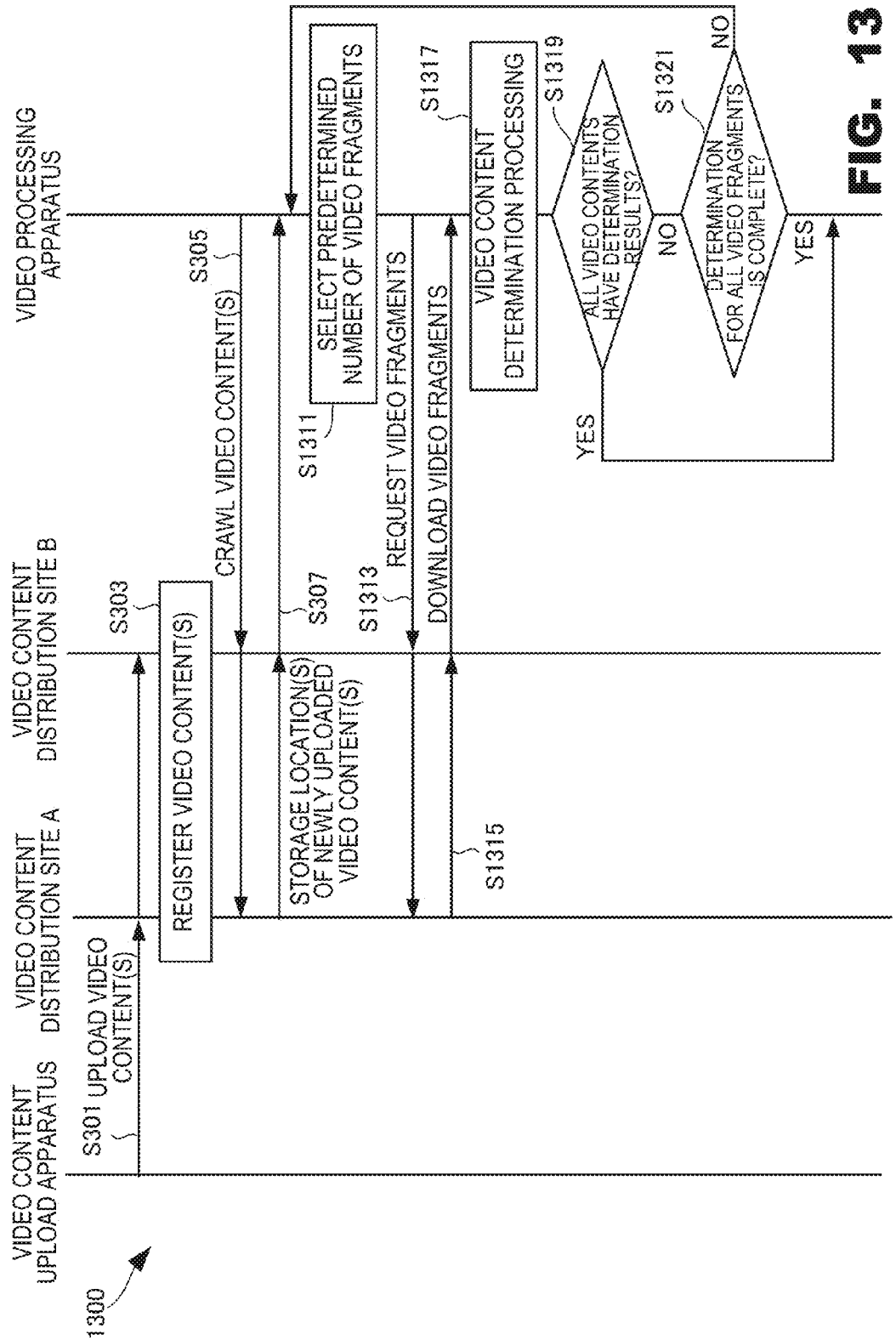
FIG. 13 is a sequence chart showing the operation procedure of a video processing system according to the third embodiment of the present invention.

FIG. 13 is a sequence chart showing an operation procedure 1300 of the video processing system according to this embodiment. The same reference numerals as in FIG. 3 of the second embodiment denote the same steps in FIG. 13.

Steps S301 to S307 are the same as in FIG. 3 of the second embodiment. In step S1311, a predetermined number of video fragments are selected from each determination target video content as download targets. In step S1313, the video processing apparatus requests to download the predetermined number of video fragments of all determination target video contents from the video content distribution sites A and B. In step S1315, the predetermined number of video fragments in all determination target video contents are downloaded in response to the request.

In step S1317, the predetermined number of downloaded video fragments in all determination target video contents are compared with the video contents accumulated in the video content DB. For a determination target video content whose determined result has been settled at this point of time, subsequent comparison/determination is stopped. In step S1319, it is judged whether the determined results of all determination target video contents have been obtained. In this case, the determined result is the matching determined result. If the determined results of all discrimination target video contents have been obtained, the processing ends. If the determined results of all determination target video contents have not been obtained, the process advances to step S1321 to judge whether the determination has been completed for all video fragments. If the determination has been completed for all video fragments, the processing ends. If the determination has not been completed for all video fragments, the process returns to step S1311 to repeat the processing for the next predetermined number of video fragments.

Note that in the above-described video fragment request, video fragment download, and video content determination processing, reduction of the amount of video fragments to be downloaded at once and speedup of the processing can be achieved by sequentially processing the video fragments of one or a predetermined number of video contents, instead of processing all video contents at once, depending on the total number of determination target video contents. The determination processing result representing whether the video contents matches wholly or partially can be notified by the video processing apparatus, or the video content distribution sites, the video content upload apparatuses, or the video viewing terminals may be notified of it.

<Processing Procedure of Video Processing Apparatus>

Figure 14:
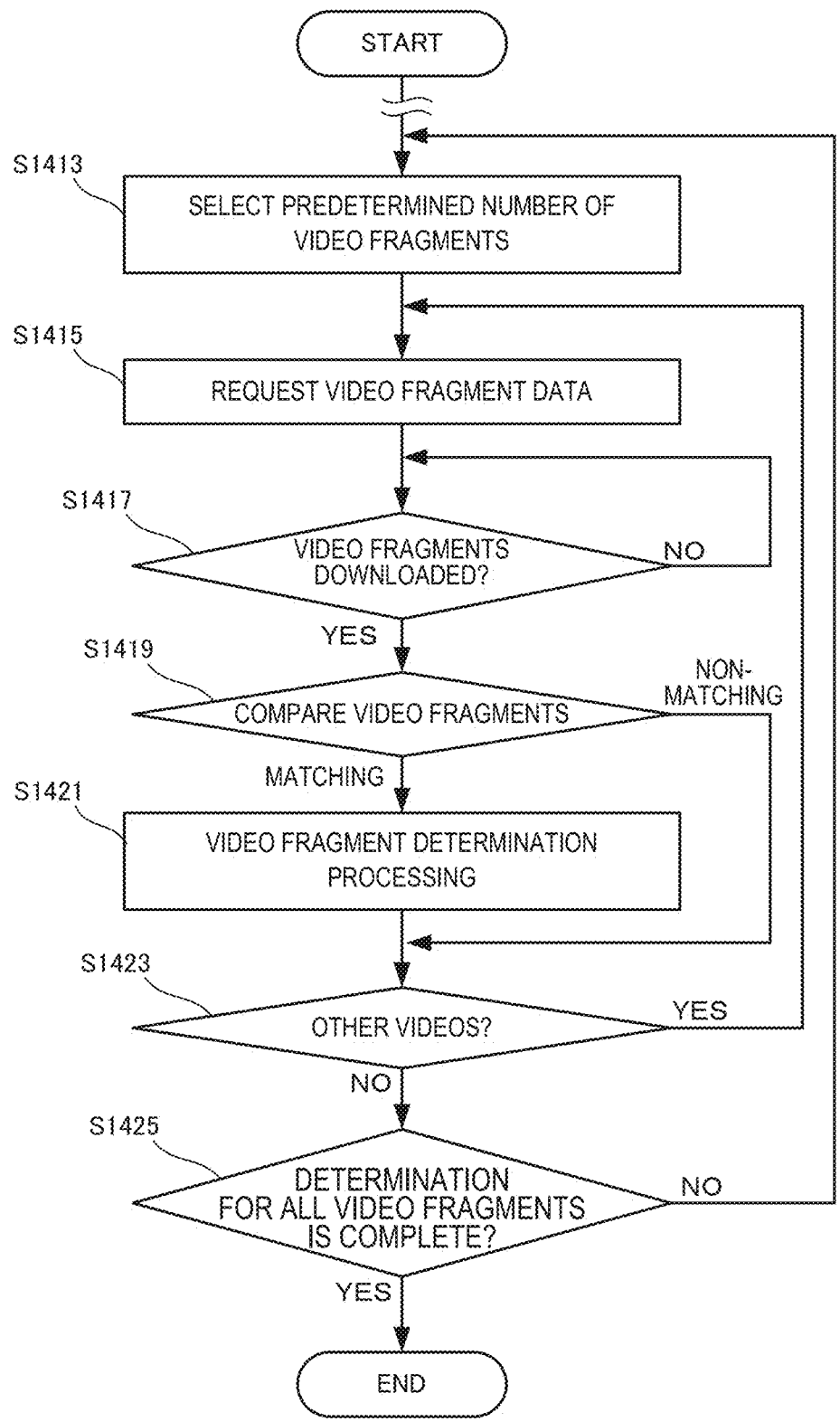
FIG. 14 is a flowchart showing the processing procedure of a video processing apparatus according to the third embodiment of the present invention.

FIG. 14 is a flowchart showing the processing procedure of a video processing apparatus 210 according to this embodiment. Processes up to step S1413 are the same as steps S1001 to S1011 in FIG. 10 and are not illustrated in FIG. 14. Hence, FIG. 14 shows processing after creation of a video fragment selection list 443.

In step S1413, a predetermined number of video fragments in each determination target video content are selected from the video fragment selection list 443. In step S1415, the data of the predetermined number of selected video fragments in each determination target video content are requested to the video content distribution sites. In step S1417, download of the video fragments in response to the request is waited. If the video fragments are downloaded, the process advances to step S1419 to compare the video fragments with the video contents accumulated in the video content DB.

If matching is obtained from the comparison result, the process advances to step S1421 to perform video fragment determination processing of determining whether matching of the video fragments can be regarded as matching of the video contents. On the other hand, if no matching is obtained from the comparison result, the process advances to step S1423 to judge whether video contents to be compared exist yet. If video contents to be compared exist, the process returns to step S1415 to repeat comparison of video fragments of the next video content. Upon judging in step S1423 that all video contents have been compared, the process advances to step S1425.

In step S1425, it is judged whether all video fragments have been compared. If video fragments remain, the process returns to step S1413 to repeat determination for the next video content in which the next predetermined number of video fragments have not been determined yet. If no video fragment remains, the processing ends.

[Fourth Embodiment]

A video processing system according to the fourth embodiment of the present invention will be described next. The video processing system of this embodiment holds a plurality of video fragment selection algorithms and selects a video fragment selection algorithm to be used in correspondence with a determination target video content, unlike the second and third embodiments in which one video fragment selection algorithm is set. In the fourth embodiment, the arrangement and operation are the same as in the second and third embodiments except selecting a video fragment selection algorithm to be used from a plurality of video fragment selection algorithms, and a detailed description thereof will be omitted. According to this embodiment, since a video fragment selection algorithm corresponding to a determination target video content is selected, more accurate determination can be performed. In addition, high-speed determination is possible because a result for a matching video content can be obtained quickly.

<Arrangement of Video Processing System>

Figure 15:
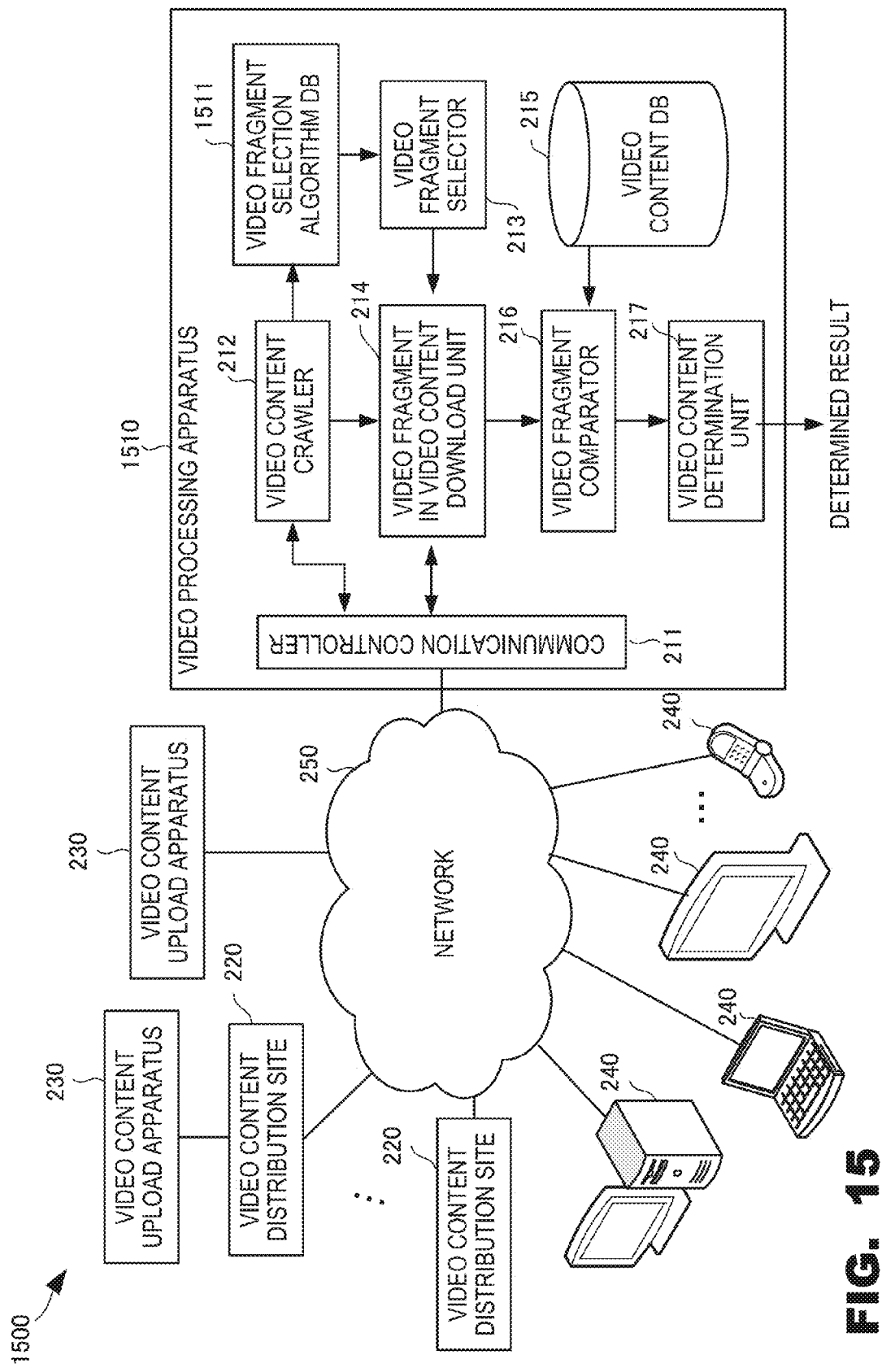
FIG. 15 is a block diagram showing the arrangement of a video processing system according to the fourth embodiment of the present invention.

FIG. 15 is a block diagram showing the arrangement of a video processing system 1500 according to this embodiment. The arrangement of the video processing system 1500 shown in FIG. 15 is the same as that of a video processing system 200 shown in FIG. 2 except a video fragment selection algorithm DB 1511 is added. The remaining functional components are the same as in FIG. 2, and a description thereof will be omitted.

The video fragment selection algorithm DB 1511 stores a plurality of video fragment selection algorithms in association with the types and details of determination target video contents (see FIG. 17). A video fragment selector 213 selects a video fragment selection algorithm in correspondence with a crawled determination target video content and selects video fragments.

<Hardware Arrangement of Video Processing Apparatus>

Figure 16:
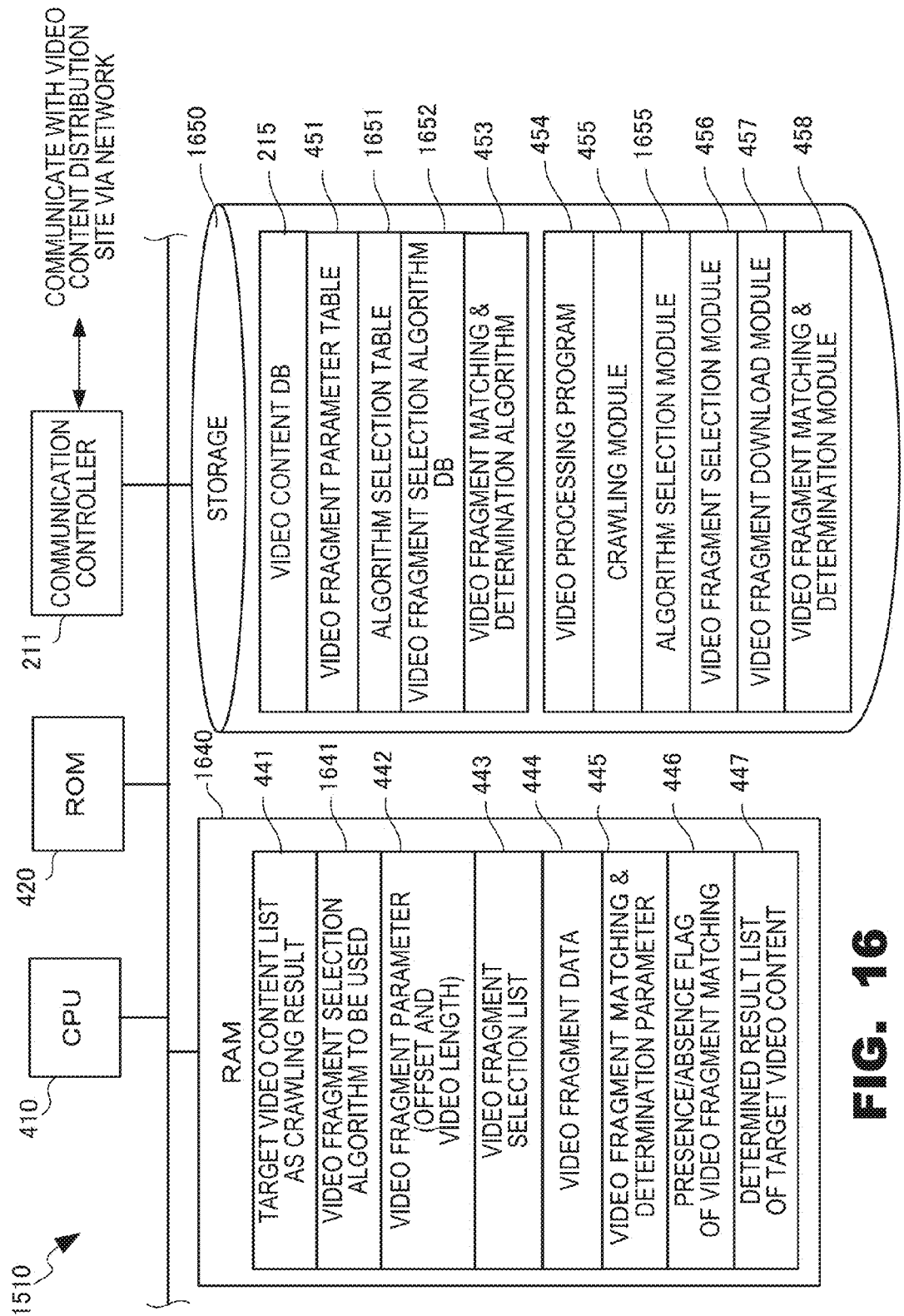
FIG. 16 is a block diagram showing the hardware arrangement of a video processing apparatus according to the fourth embodiment of the present invention.

FIG. 16 is a block diagram showing the hardware arrangement of a video processing apparatus 1510 according to this embodiment. In the hardware arrangement of the video processing apparatus 1510 shown in FIG. 16, components and processes for selecting a video fragment selection algorithm to be used from a plurality of video fragment selection algorithms are changed or added as compared to the hardware arrangement of the video processing apparatus 210 shown in FIG. 4. The same reference numerals as in FIG. 4 denote components having the same functions, and a description thereof will be omitted.

A video fragment selection algorithm 1641 to be used in a RAM 1640 is video fragment selection algorithm selected in correspondence with a determination target video content. This is the change in the RAM 1640. A storage 1650 additionally stores an algorithm selection table 1651 used to select the video fragment selection algorithm, and a video fragment selection algorithm DB 1652 serving as an algorithm storage that stores a plurality of video fragment selection algorithms to be selectively used in correspondence with a video content. As a program, an algorithm selection module 1655 that is included in a video processing program 1654 and selects a video fragment selection algorithm to be used is added. Note that FIG. 16 illustrates the data and programs indispensable in this embodiment but not general-purpose data and programs such as the OS.

(Arrangement of Algorithm Selection Table)

FIG. 17 is a view showing the arrangement of the algorithm selection table 1651 according to this embodiment.

The algorithm selection table 1651 stores a main video fragment selection algorithm 1703 to be used and other video fragment selection algorithm(s) 1704 to be used in association with a type 1701 and details 1702 of a determination target video content.

A video fragment selection algorithm to be used is selected from the video fragment selection algorithm DB (not shown: see FIG. 12) in accordance with the algorithm selection table 1651.

<Processing Procedure of Video Processing Apparatus>

Figure 18:
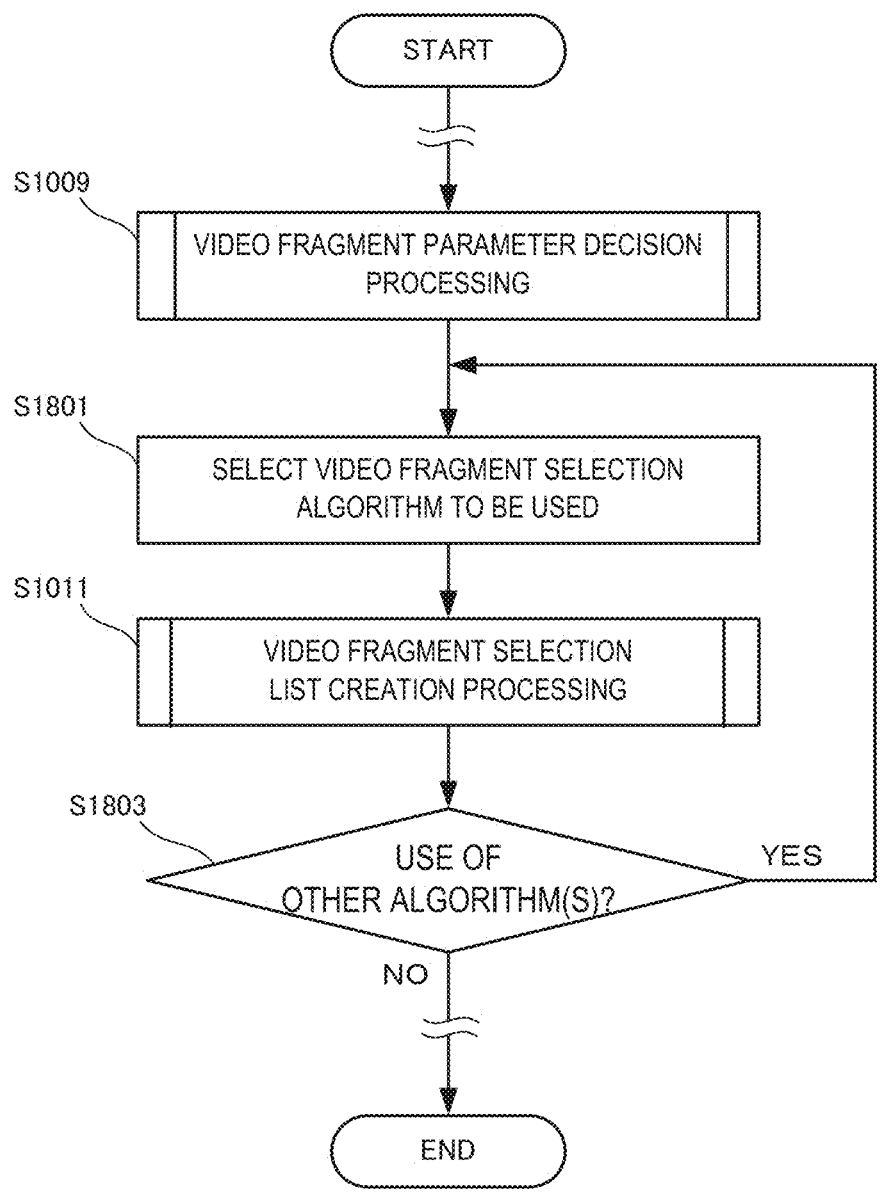
FIG. 18 is a flowchart showing the processing procedure of the video processing apparatus according to the fourth embodiment of the present invention.

FIG. 18 is a flowchart showing the processing procedure of the video processing apparatus 1510 according to this embodiment. In the processing procedure shown in FIG. 18, the portion of steps S1009 and S1011 of the processing procedure shown in FIG. 10 is replaced. Note that steps S1009 and S1011 of the same procedure are directly illustrated. The rest of the processing procedure is the same as in FIG. 10 and is not illustrated.

After the video fragment parameter decision processing in step S1009, a video fragment selection algorithm to be used is selected in accordance with the algorithm selection table 1651 in step S1801. In step S1011, a video fragment selection list 443 is created using the selected video fragment selection algorithm. In step S1803, it is judged whether to use other algorithm(s). To use the other algorithm, the process returns to step S1801 to repeat the processing using the other algorithm. After that, processing from step S1013 in FIG. 10 is executed.

Note that the other algorithm is used to combine a plurality of algorithms, as shown in FIG. 17. However, if, for example, no matching is obtained by one algorithm, the other algorithm is used to verify whether no matching is obtained by the other algorithm, either.

[Fifth Embodiment]

A video processing system according to the fifth embodiment of the present invention will be described next. The video processing system of this embodiment is different from the second to fourth embodiments in that frame features are used to compare video fragments with accumulated video contents. The rest of the arrangement and operation is the same as in the second to fourth embodiments, and a detailed description thereof will be omitted. According to this embodiment, matching comparison is performed based on frame features of a smaller data amount. This allows to executing determination at a high speed using a small storage capacity.

<Arrangement of Video Processing System>

Figure 19:
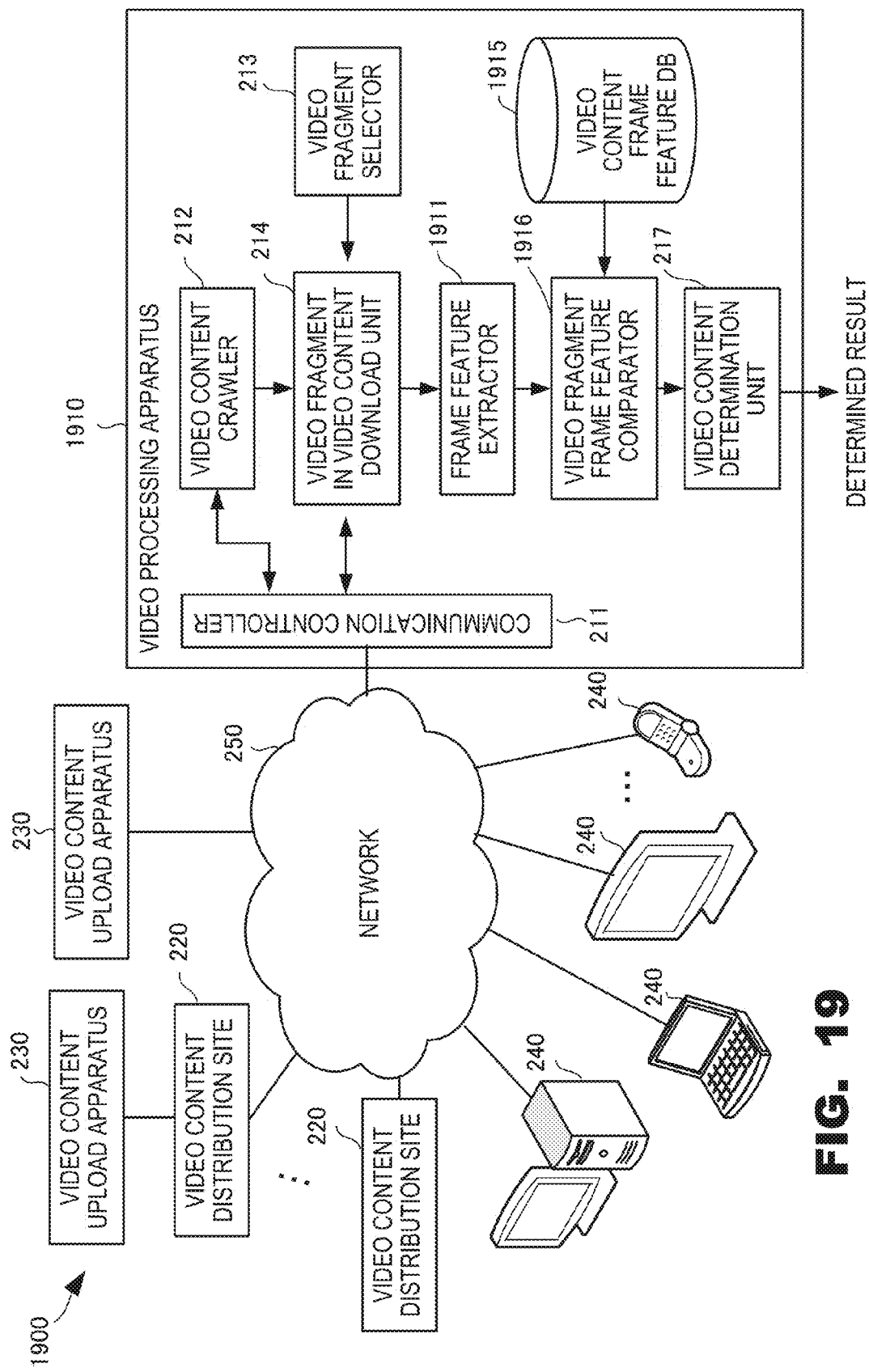
FIG. 19 is a block diagram showing the arrangement of a video processing system according to the fifth embodiment of the present invention.

FIG. 19 is a block diagram showing the arrangement of a video processing system 1900 according to this embodiment. The arrangement of the video processing system 1900 shown in FIG. 19 is different from that of the video processing system 200 shown in FIG. 2 in the following point. That is, a video processing apparatus 1910 includes a frame feature extractor 1911 that extracts a frame feature from each frame of downloaded video fragments, a video content frame feature DB 1915 that accumulates the frame features of the video contents to be compared, and a video fragment frame feature comparator 1916 that compares the extracted frame features of video fragments and the accumulated frame features of a video content. As for the remaining functional components, the same reference numerals as in FIG. 2 denote functional components having the same functions, and a description thereof will be omitted.

(Arrangement and Processing of Frame Feature Extractor)

Figure 20A:
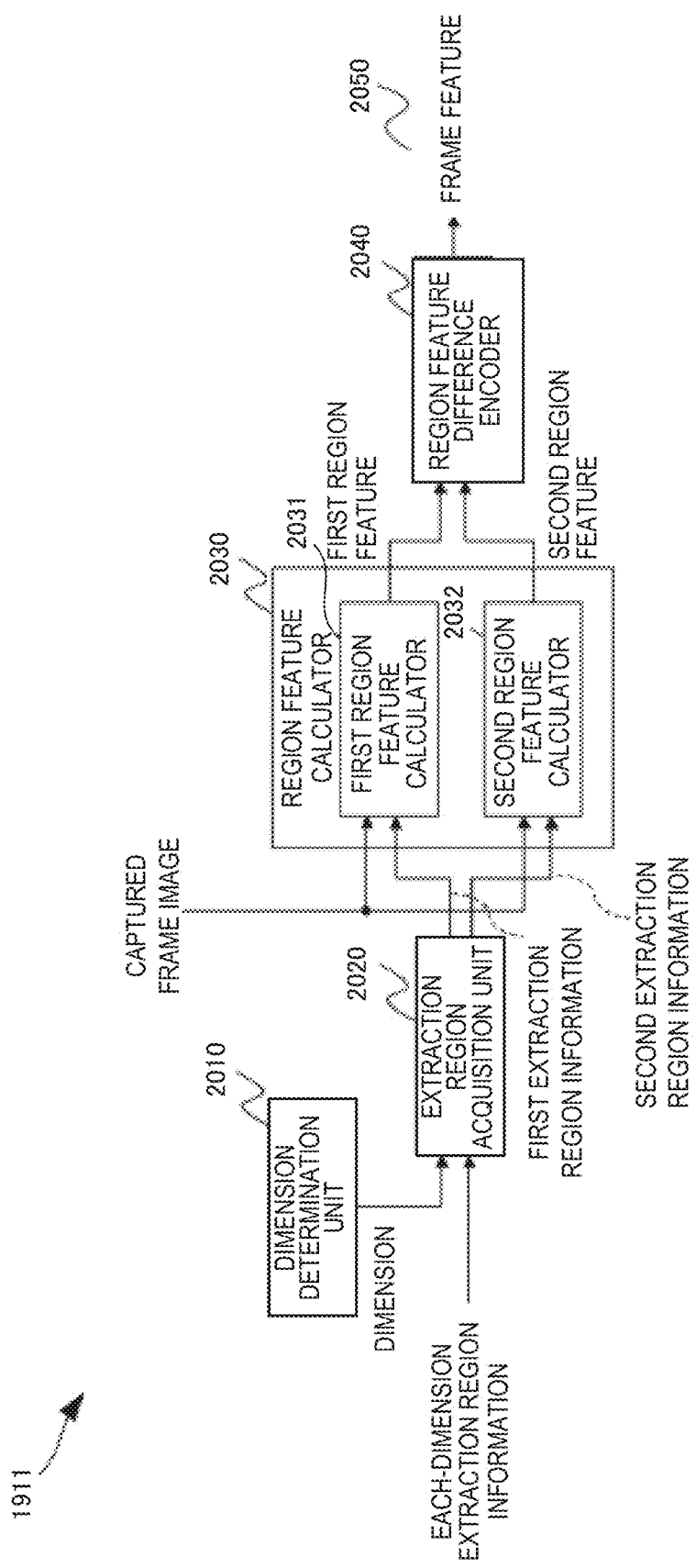
FIG. 20A is a block diagram showing the arrangement of a frame feature extractor according to the fifth embodiment of the present invention.

FIG. 20A is a block diagram showing the arrangement of the frame feature extractor 1911 according to this embodiment. The frame feature extractor 1911 applied in this embodiment is a functional component that extracts a video signature employed in standardization of MPEG7.

Referring to FIG. 20A, an output frame feature 2050 is generated by providing a number of pairs of regions having different sizes or shapes in each frame of a captured video, quantizing (actually, ternarizing) a difference in average luminance value as a kind of region feature between a pair of regions and encoding the quantized values of the differences. A dimension determination unit 2010 determines the number of region pairs. One dimension corresponds to one region pair. An extraction region acquisition unit 2020 acquires the region pair of each dimension to calculate a frame feature in accordance with the determination of the dimension determination unit 2010. A region feature calculator 2030 includes a first region feature calculator 2031 and a second region feature calculator 2032, each of which calculates the average luminance as a kind of region feature of each region of the region pair of each dimension. A region feature difference encoder 2040 calculates the difference of the average luminances as region features of respective regions of the region pair, quantizes and encodes the difference in accordance with a third threshold, and outputs the frame feature 2050.

In this example, the region feature represented by the average luminance will be explained below. However, the region feature is not limited to the average luminance of the region. Another processing of the luminance or a frame feature other than the luminance is also applicable.

Figure 20B:
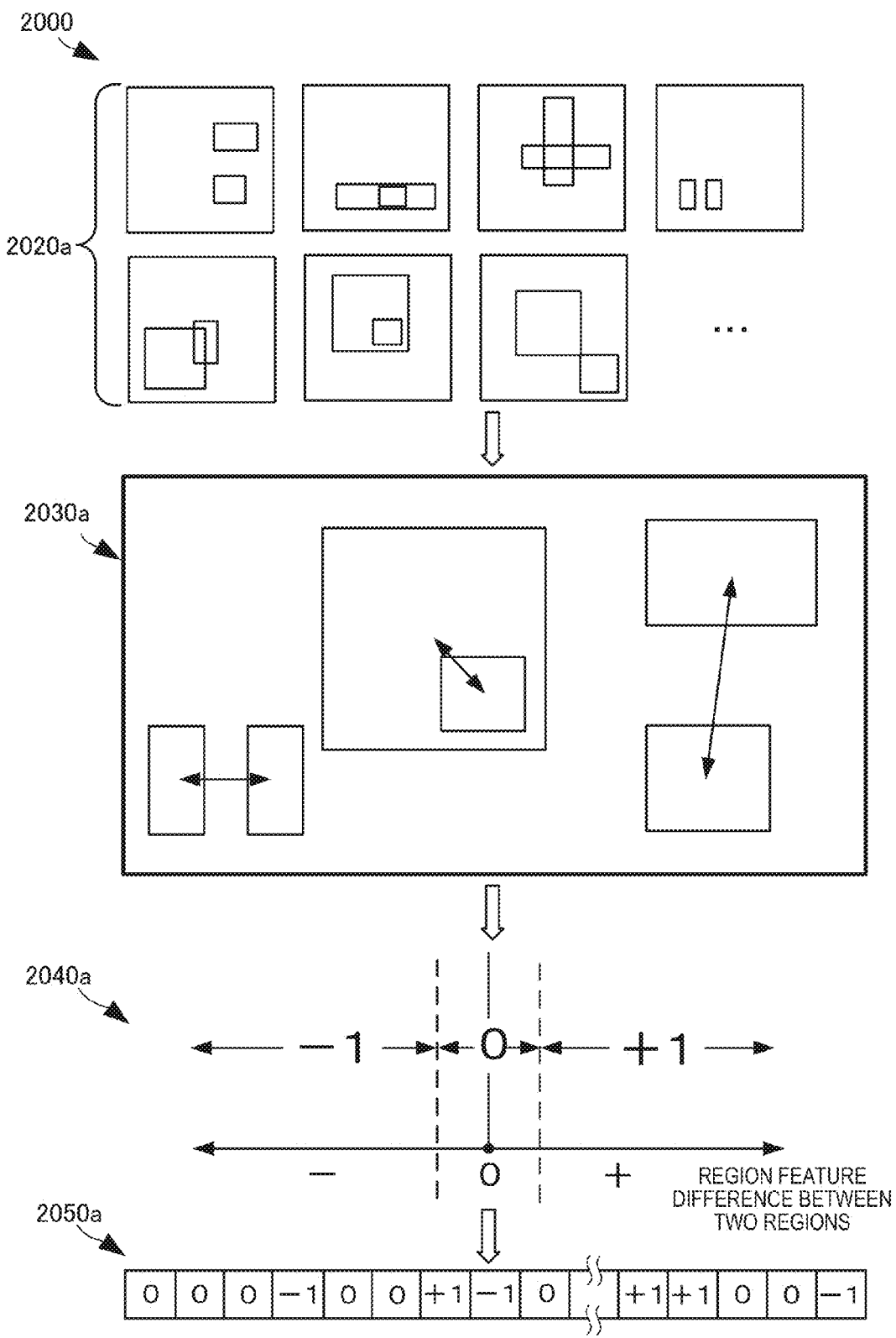
FIG. 20B is a view showing processing of the frame feature extractor according to the fifth embodiment of the present invention.

FIG. 20B is a view showing processing of the frame feature extractor according to this embodiment.

In FIG. 20B, 2020a indicates several examples of region pairs acquired by the extraction region acquisition unit 2020 shown in FIG. 20A. In 2020a, each outer frame represents a frame, and each internal rectangle represents a region.

In FIG. 20B, 2030a expresses the relationship of extracting regions of region pairs from the extraction region acquisition unit 2020 and calculating the difference between the regions in a frame image. A state in which two regions of a region pair are extracted in the frame image, the average luminance of the pixels included in each region is calculated, and the difference of the average luminances is calculated is indicated by an arrow that connects the centers of the regions.

In FIG. 20B, 2040a represents a state in which the calculated difference is quantized. In 2040a, if the difference obtained by subtracting a second region feature from a first region feature in FIG. 20A is equal to or smaller than the difference serving as the third threshold indicated by the broken lines on both sides of the difference "0" (corresponding to a case in which the average luminances equal), "0" is the output value of quantization. If the difference is a positive (+) value on the positive side of the broken line, "+1" is the output value of quantization. If the difference is a negative (−) value on the negative side of the broken line, "−1" is the output value of quantization. The difference is thus encoded to the three values "−1", "0" and "+1" to decrease the data amount of each dimension and generate information of dimensions as many as possible, thereby facilitating separation of the frame features and decrease the calculation amount in comparison of the frame features. It is therefore unnecessary to limit to the example of the three values. Note that the third threshold indicated by the broken line is selected based on the ratio of "0" and quantized difference values in the distribution of difference values of all dimensions to be used. For example, a value with which the ratio of "0" and quantized difference values becomes 50% is selected.

In FIG. 20B, 2050a represents an example of a frame feature generated by collecting the results of quantization of the differences. As a simple example, the frame feature is generated by arranging the quantized values of the differences in the one-dimensional direction in the order of dimension. Note that the frame feature is not limited to this example and need not always be obtained by simply arranging the quantized values of the differences in the one-dimensional direction in the order of dimension but may be generated by arranging the values in multidimensional directions or further applying an additional operation.

FIG. 20C is a view showing the extraction regions of the frame feature extractor according to this embodiment.

In FIG. 20B, 2020a indicates the region pair of each dimension by two rectangular regions. However, to calculate a frame feature appropriately expressing a frame, a shape other than a rectangle may be preferable. Extraction regions shown in FIG. 20C exemplify region pairs each including two regions that are not rectangular. Several hundred dimensions can be set even when comparison of frame features in real time or comparison of video content frame feature groups that are sets of frame features by ternarizing each dimension, as indicated by 2040a in FIG. 20B.

(Arrangement of Video Content Frame Feature DB)

Figure 21:
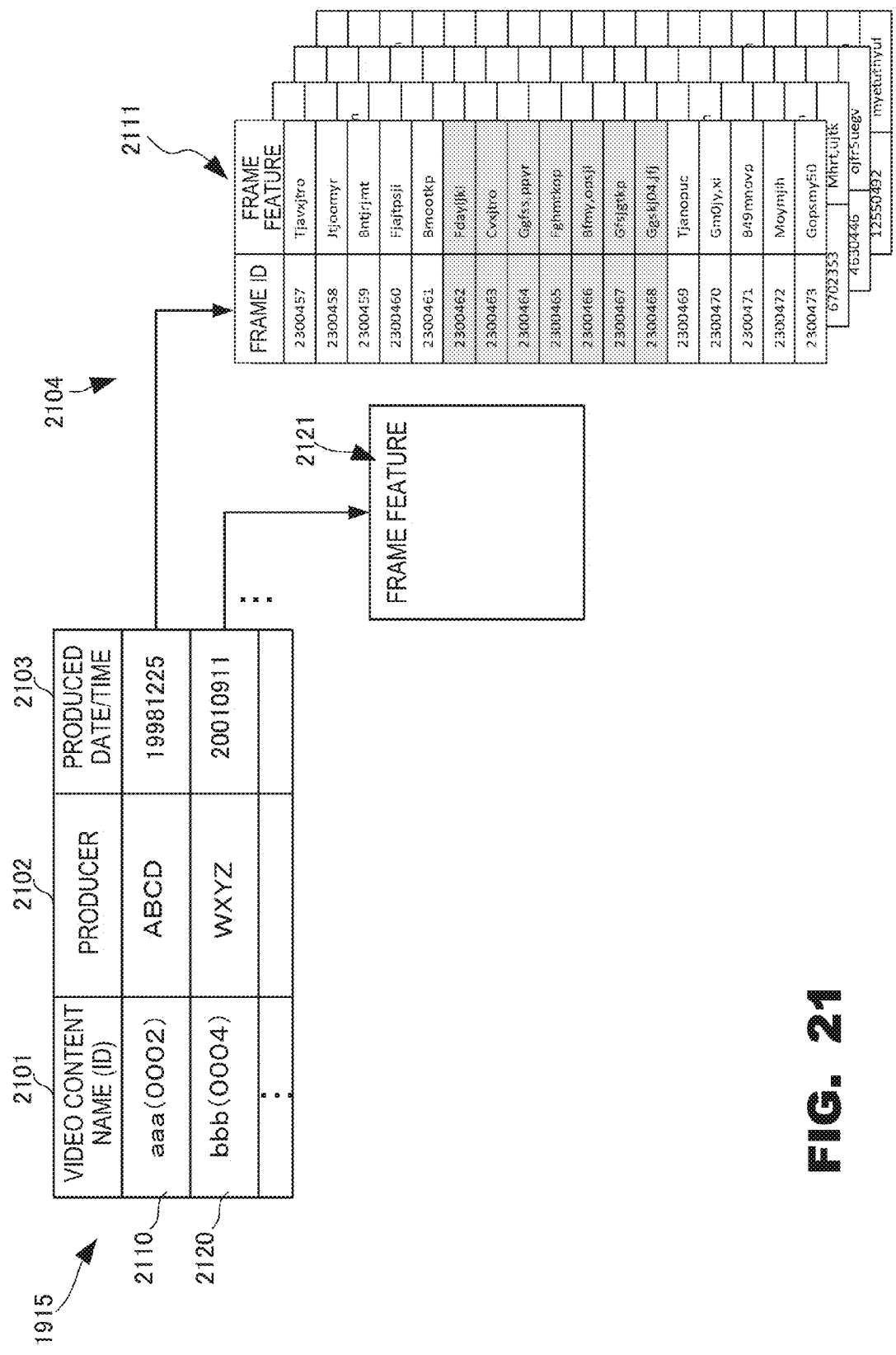
FIG. 21 is a view showing the arrangement of a video content frame feature DB according to the fifth embodiment of the present invention.

FIG. 21 is a view showing the arrangement of the video content frame feature DB 1915 according to this embodiment.

The video content frame feature DB 1915 shown in FIG. 21 stores a production company 2102, a produced date/time 2103, and a frame feature 2104 associated with a frame ID in association with a video content name (ID) 2101. As a video content 2110, a frame feature sequence 2111 is stored. As a video content 2120, a frame feature sequence 2121 is stored.

(Arrangement of Video Fragment Content Determined Result List)

Figure 22:
FIG. 22 is a view showing the arrangement of a determined result list of target video contents according to the fifth embodiment of the present invention.

FIG. 22 is a view showing the arrangement of a video fragment content determined result list 2200 according to this embodiment. In the video fragment content determined result list 2200 shown in FIG. 22, the frame feature of a video fragment and an associated video content that can be determined by frame feature comparison are added to the video fragment content determined result list 447 shown in FIG. 8 of the second embodiment. In addition, not only a video content but also one scene of the video content is stored as the determined result.

That is, the video fragment content determined result list 2200 shown in FIG. 22 stores a frame feature sequence 2205, a determined result 2206 stored together with the ID and scene ID of the matching video content, and an ID and scene ID 2207 of an associated video content in association with a video content ID 2201, a video fragment SN 2202, a video fragment start 2203, and a video fragment end 2204. As described above with reference to FIGS. 6 to 8 of the second embodiment, the video fragment end 2204 need not be fixed from the beginning and may change dynamically. In the fifth embodiment, matching is determined by comparing frame features. Hence, the video fragment end is dynamically changed so as to obtain a predetermined amount of frame features whose reliability is equal to or more than a threshold. When the frame feature is calculated based on the luminance value difference between two regions, for example, the reliability of the frame feature is high in a frame having a large change in the luminance value. In a frame having a small change in the luminance value, the reliability of the frame feature is low. Note that the data are not limited to those described above.

[Sixth Embodiment]

A video processing system according to the sixth embodiment of the present invention will be described next. The video processing system of this embodiment is different from the fifth embodiment in that frame feature extraction is performed in a video content distribution site or a video content upload apparatus. For this reason, the video processing apparatus downloads the video fragments of a determination target video content not as video data but as the frame features of the video fragments. The rest of the arrangement and operation is the same as in the fifth embodiment, and a detailed description thereof will be omitted. According to this embodiment, the same effect as in the fifth embodiment can be obtained, and the channel capacity can also greatly be reduced because video fragment download is done using frame features.

<Arrangement of Video Processing System>

Figure 23:
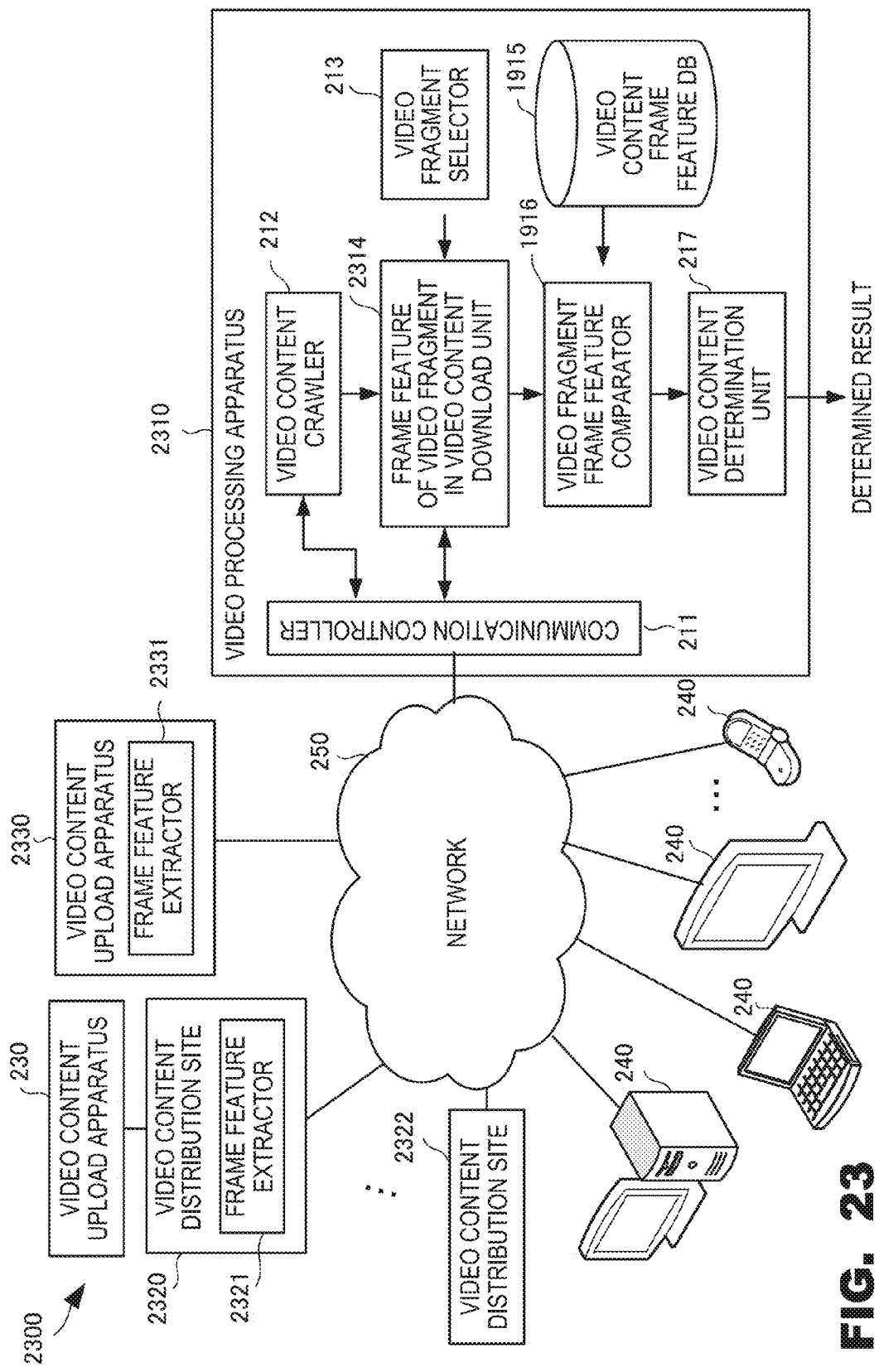
FIG. 23 is a block diagram showing the arrangement of a video processing system according to the sixth embodiment of the present invention.

FIG. 23 is a block diagram showing the arrangement of a video processing system 2300 according to this embodiment. In the video processing system 2300 shown in FIG. 23, the same reference numerals as in the video processing system 1900 shown in FIG. 19 denote the same functional components. Points of difference will be explained below.

A video processing apparatus 2310 includes a frame feature of video fragment in video content download unit 2314 that downloads, via a network 250, frame features already extracted from video fragments, in place of the video fragment in video content download unit 214 of the video processing apparatus 1910. The video processing apparatus 2310 does not include the frame feature extractor 1911 provided in the video processing apparatus 1910 shown in FIG. 19. The rest is the same as in FIG. 19.

On the other hand, a video content distribution site 2320 or 2322 includes a frame feature extractor 2321. A video content upload apparatus 2330 also includes a frame feature extractor 2331.

[Seventh Embodiment]

A video processing system according to the seventh embodiment of the present invention will be described next. If the determination of a video content cannot be established even by comparing video fragments, the video processing system of this embodiment downloads the whole video content to obtain a reliable determined result, unlike the second to sixth embodiments. The arrangement and operation for video content determination by video fragment comparison are the same as in the second embodiment. Hence, the same reference numerals are added for the same arrangement and operation, and a detailed description thereof will be omitted. According to this embodiment, even if matching cannot clearly be settled by video fragment comparison, a reliable determined result can be output.

<Arrangement of Video Processing System>

Figure 24:
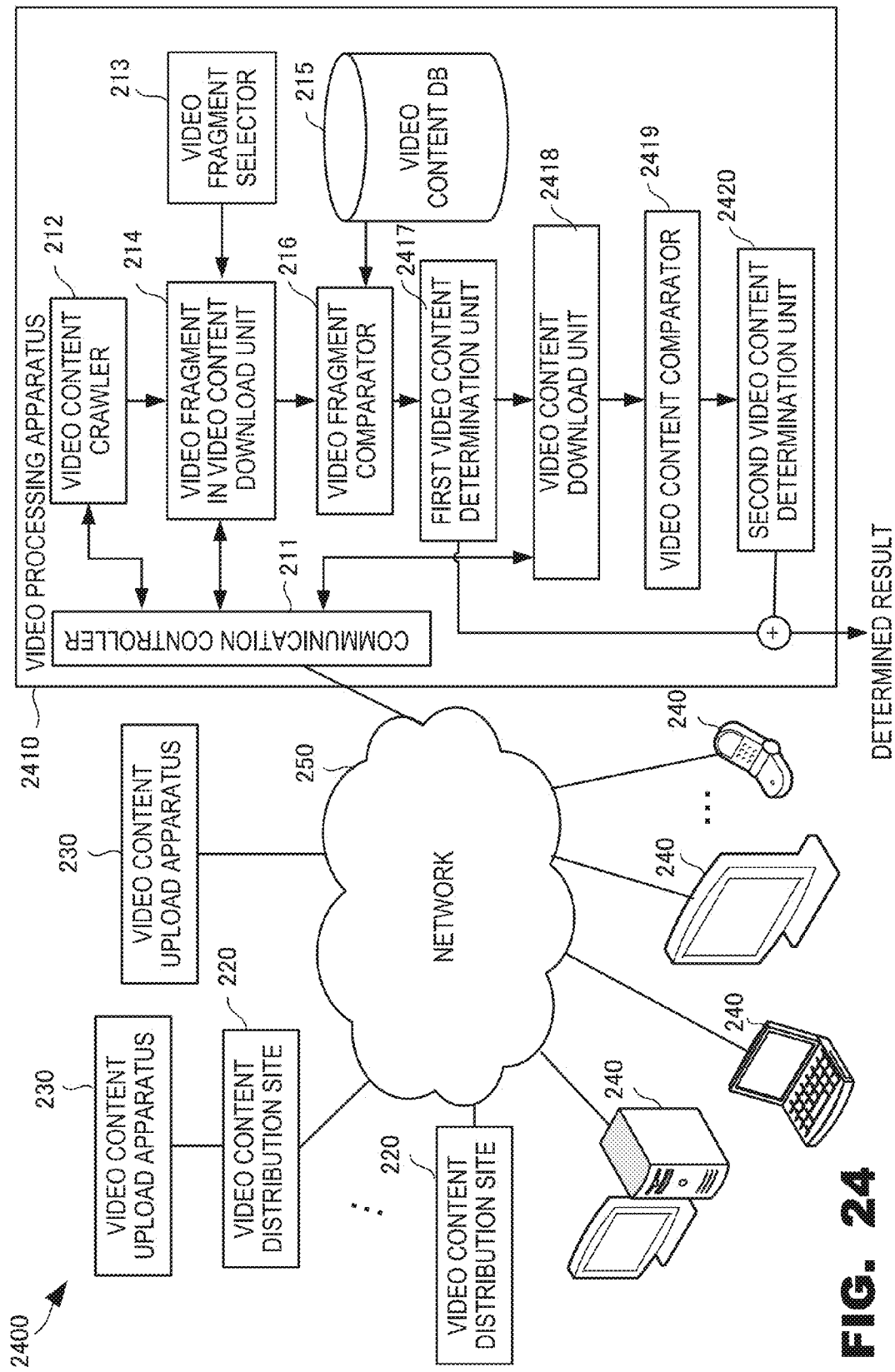
FIG. 24 is a block diagram showing the arrangement of a video processing system according to the seventh embodiment of the present invention.

FIG. 24 is a block diagram showing the arrangement of a video processing system 2400 according to this embodiment. In a video processing apparatus 2410 of the video processing system 2400 shown in FIG. 24, a portion that downloads a video content and compares it is added. However, a portion that compares video fragments is the same as in FIG. 2 of the second embodiment. Hence, the same reference numerals denote the same functional components, and a description thereof will be omitted.

In the video processing apparatus 2410, a first video content determination unit 2417 performs the same determination processing as in the video content determination unit 217 shown in FIG. 2 except that the first video content determination unit 2417 transmits a result in which the target video content is not determined clearly as matching video content but may be the matching video content, to a video content download unit 2418 in the subsequent stage. In the second embodiment, a result In which the target video content is not determined clearly as matching video content but may be the matching video content must absolutely be classified as matching or non-matching, or otherwise output as uncertain. In the seventh embodiment, an uncertain portion is more clearly determined by second video content determination.

The video content download unit 2418 downloads the video content, which cannot clearly be determined by video fragment comparison, from a video content distribution site 220 via a communication controller 211. A video content comparator 2419 sequentially compares the downloaded video content with the video contents accumulated in a video content DB 215. A second video content determination unit 2420 determines, based on the video content comparison result, whether the video contents match wholly or partially, and outputs the result together with the result of the first video content determination unit 2417.

Note that in the seventh embodiment, if communication and comparison are executed using frame features, as in the fifth and sixth embodiments, the channel capacity can greatly be reduced, and the processing speed can be increased.

<Operation Procedure of Video Processing System>

Figure 25:
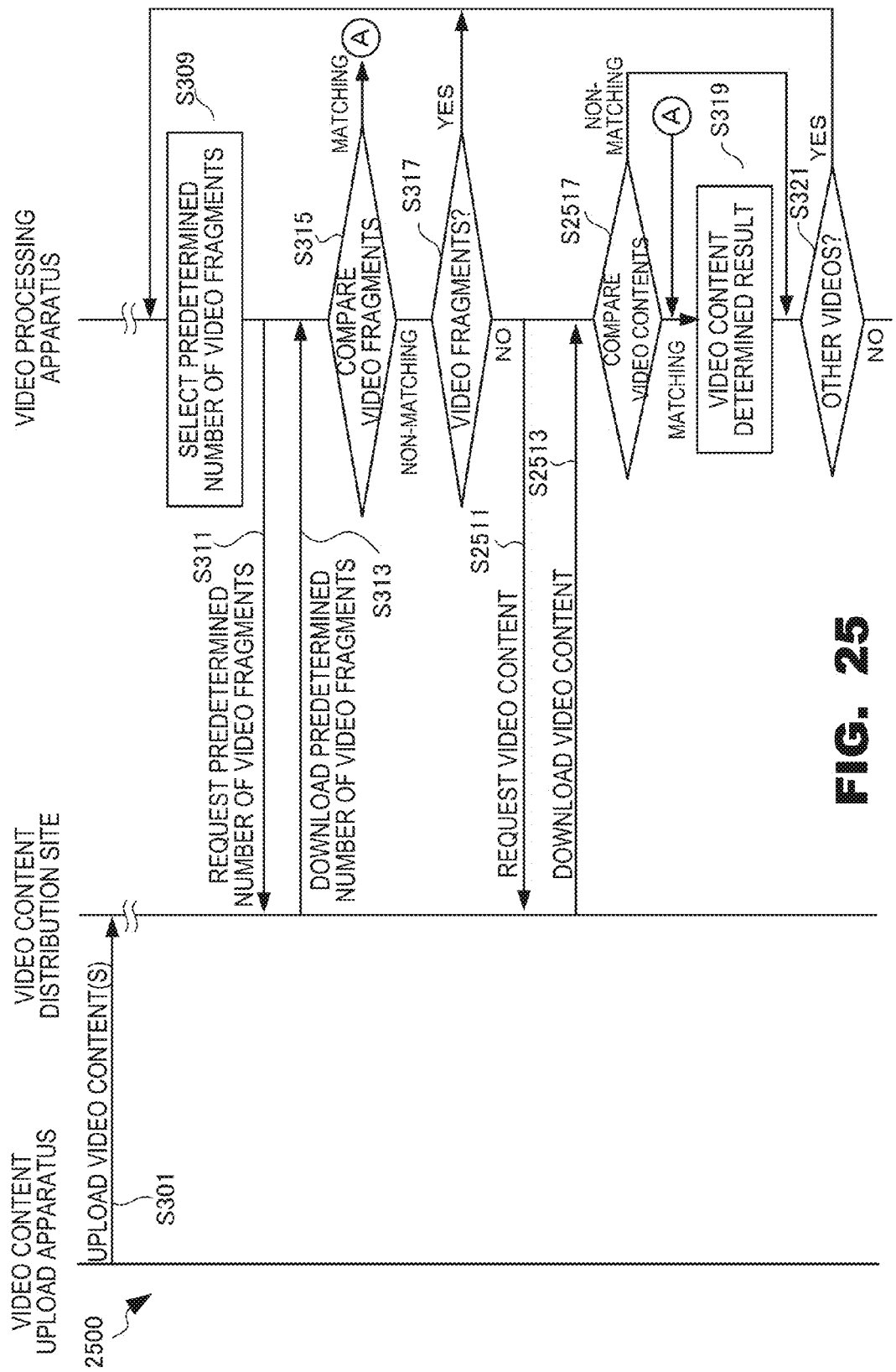
FIG. 25 is a sequence chart showing the operation procedure of the video processing system according to the seventh embodiment of the present invention.

FIG. 25 is a sequence chart showing an operation procedure 2500 of the video processing system 2400 according to this embodiment. In the operation procedure 2500 in FIG. 25, the operation up to matching determination by video fragment comparison is the same as in the operation procedure 300 shown in FIG. 3. Hence, the same reference numerals denote the same steps, and a description thereof will be omitted.

If no matching is obtained by video fragment comparison (non-matching in step S315), and no video fragment remains anymore (NO in steps S317), the video processing apparatus requests to download the determination target video content in step S2511. In step S2513, the video content is downloaded from the video content distribution site 220 in response to the request. In step S2517, the downloaded video content is compared with the video contents accumulated in the video content DB. If no matching is obtained from the comparison result, the process advances to step S321 to judge whether other video contents remain. If no other video content remains, the processing ends. If other video content remains, the process returns to step S309 to repeat the determination processing of the next video content. If the video contents match upon comparison, the video content determined result is output in addition to the matching result of the video fragment comparison in step S319.

<Processing Procedure of Video Processing Apparatus>

Figure 26:
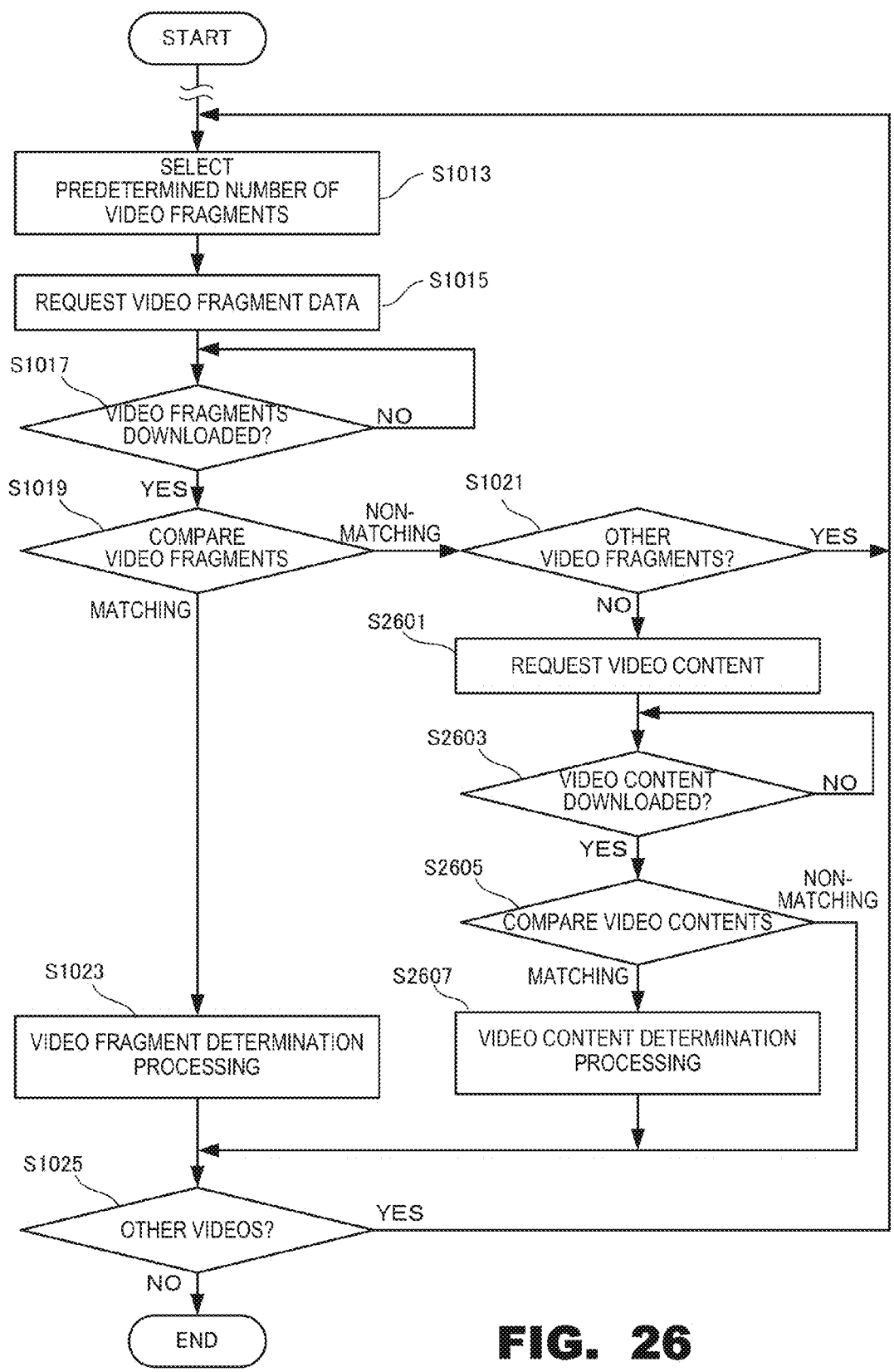
FIG. 26 is a flowchart showing the processing procedure of the video processing apparatus according to the seventh embodiment of the present invention.

FIG. 26 is a flowchart showing the processing procedure of the video processing apparatus 2410 according to this embodiment. Note that the arrangement of the video processing apparatus 2410 is different from that of the video processing apparatus shown in FIG. 2 in that a component concerning second video content comparison and determination is added, and is not illustrated. Note that the arrangement of the video processing apparatus 2410 is self-evident upon referring to FIG. 27 that illustrates the arrangement of a video processing apparatus 2710 according to the eighth embodiment to be described later.

Referring to FIG. 26, comparison/determination using video fragments is the same as in the processing procedure shown in FIG. 10. The same reference numerals denote the same steps, and a description thereof will be omitted. In step S1021, if no matching is obtained from comparison of video fragments (non-matching in step S1019), and no video fragment to be compared exists yet (NO in step S1021), the process advances to step S2601 to request to download a video content from the video content distribution site 220 including the determination target video content. In step S2603, download of the video content is waited. If the download is performed, the process advances to step S2605. In step S2605, the downloaded video content is compared with the video contents accumulated in the video content DB. If the video contents do not match, the process advances to step S1025 to determine the next video content. If the video contents match, the process advances to step S2607 to perform video content determination processing.

Note that when comparing the video contents, the determination speed may be increased by comparing the video contents in descending order of matching possibility in correspondence with the matching level in video fragment comparison, or excluding video contents that cannot match at all from comparison, instead of comparing all video contents in the video content DB.

[Eighth Embodiment]

A video processing system according to the eighth embodiment of the present invention will be described next. The video processing system according to the eighth embodiment is different from that of the seventh embodiment. That is, the video content monitoring of the present embodiment is executed for determining whether there is illegality, while the video content monitoring of the seventh embodiment is executed for determining whether the video contents match with each other. Also, comparison of the present embodiment is performed using frame features. The illegality includes a copyright problem in which uploaded video contents wholly or partially use existing video contents, and a problem in which video contents handle subjects that should not be distributed from the viewpoint of public policy. In this embodiment, the copyright problem (including a copy of an existing scene) will be described. In the eighth embodiment, determination of the seventh embodiment is replaced with illegality determination, and the frame feature extractor of the fifth embodiment is provided. The arrangement and operation are the same as those of a combination of the fifth and seventh embodiments. Hence, the same reference numerals are added for the same arrangement and operation, and a detailed description thereof will be omitted.

According to this embodiment, illegality determination target video contents are collected using the frame features of video fragments. This allows to reducing the channel capacity and implement quick illegality judgment.

<Arrangement of Video Processing System>

Figure 27:
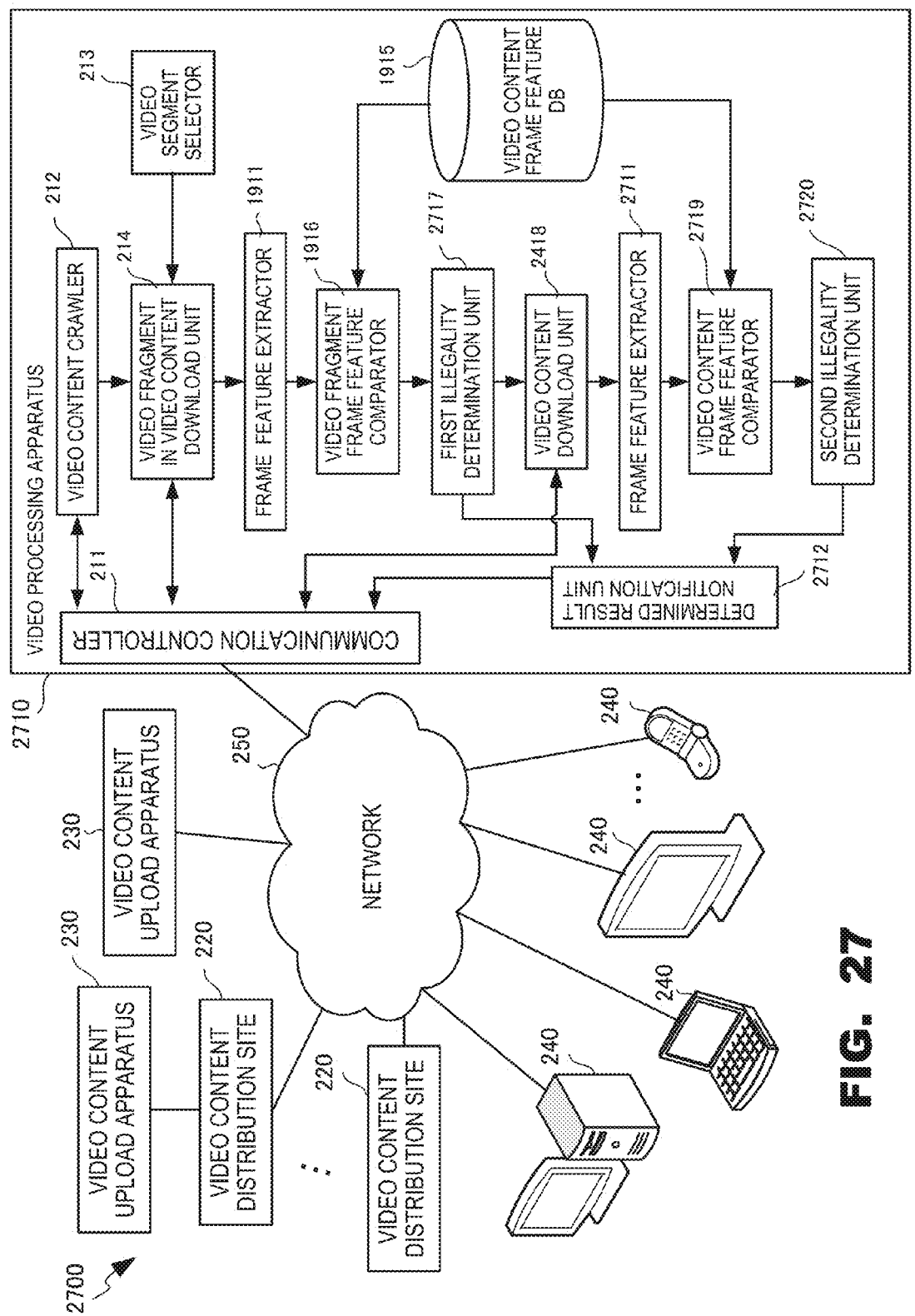
FIG. 27 is a block diagram showing the arrangement of a video processing system according to the eighth embodiment of the present invention.

FIG. 27 is a block diagram showing the arrangement of a video processing system 2700 according to this embodiment. In a video processing apparatus 2710 of the video processing system 2700 shown in FIG. 27, the following functional components are added to the arrangement shown in FIG. 19 of the fifth embodiment.

If a scene matching an existing video content is included in a determination target video content based on the comparison result of a video fragment frame feature comparator 1916, a first illegality determination unit 2717 judges that there is illegality. As in the seventh embodiment, a video content download unit 2418 further downloads the video content if the determination of the first illegality determination unit 2717 is uncertain. A frame feature extractor 2711 extracts the frame features of the downloaded video content. A video content frame feature comparator 2719 compares the frame features of the video content extracted by the frame feature extractor 2711 with the frame features of video contents in a video content frame feature DB 1915. If a scene matching the existing video content is included or many similar scenes are found in the target video content based on the comparison result of the video content frame feature comparator 2719, a second illegality determination unit 2720 determines that there is illegality. If any one of the first illegality determination unit 2717 and the second illegality determination unit 2720 determines illegality, a determined result notification unit 2712 notifies the operator of a video content distribution site 220 or a video content upload apparatus 230 that the illegal video content has been uploaded, thereby calling attention.

<Operation Procedure of Video Processing System>

Figure 28:
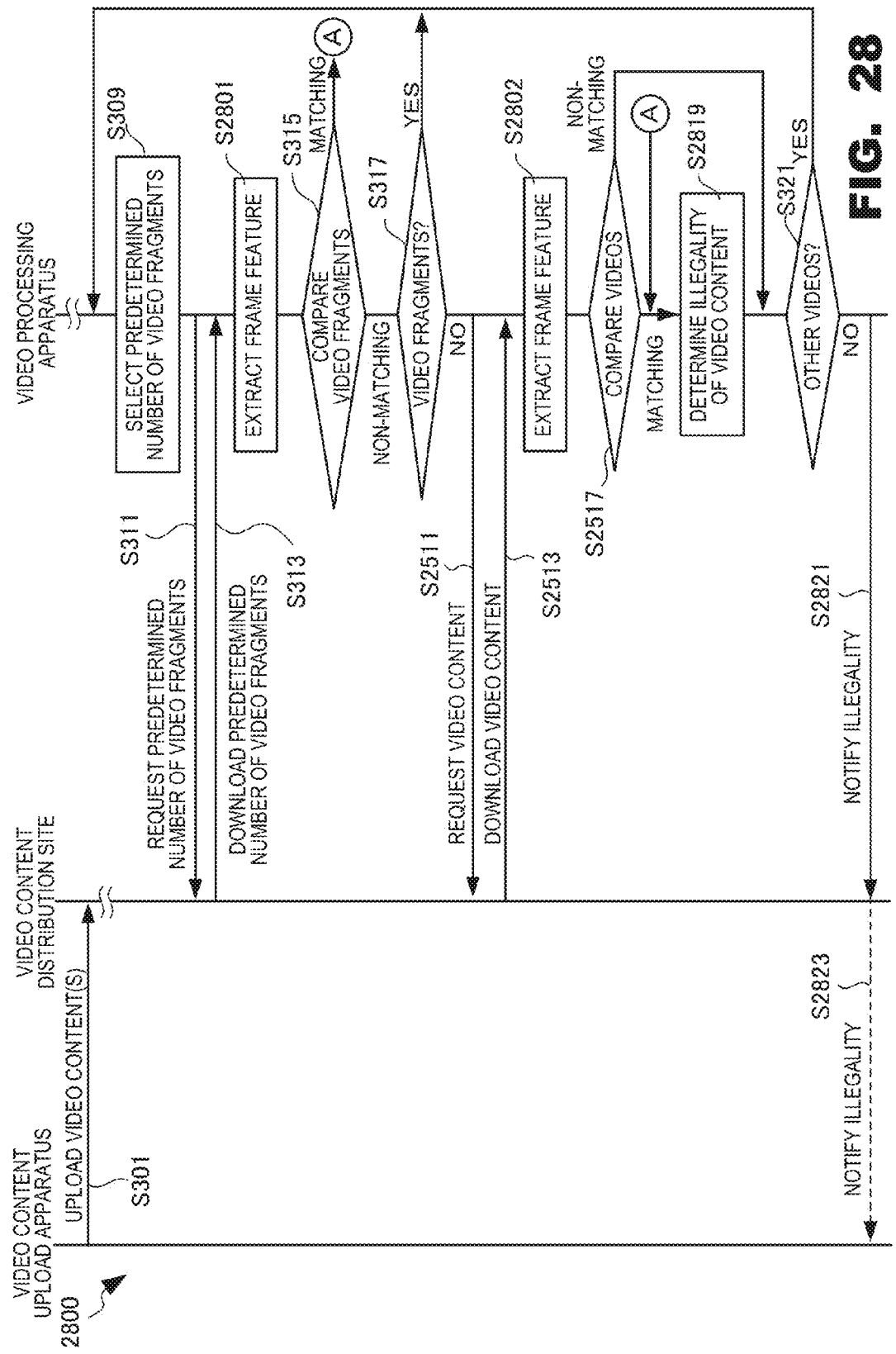
FIG. 28 is a sequence chart showing the operation procedure of the video processing system according to the eighth embodiment of the present invention.

FIG. 28 is a sequence chart showing an operation procedure 2800 of the video processing system 2700 according to this embodiment. The same reference numerals as in FIG. 3 or 25 denote the same steps in FIG. 28.

Referring to FIG. 28, after a predetermined number of video fragments are downloaded in step S313, the frame features of the video fragments are extracted in step S2801. In addition, after a video content is downloaded in step S2513, the frame features of the video content are extracted in step S2802. If the matching level satisfies a predetermined condition upon comparing the video fragments or comparing the video contents using the frame features, the illegality of the video content is determined in step S2819. An existing criterion is used as the criterion of illegality determination. In step S2823, the video processing apparatus notifies the video content distribution site or the video content upload apparatus that is the upload source of the illegality determined result.

<Arrangement of Video Processing Apparatus>

Figure 29:
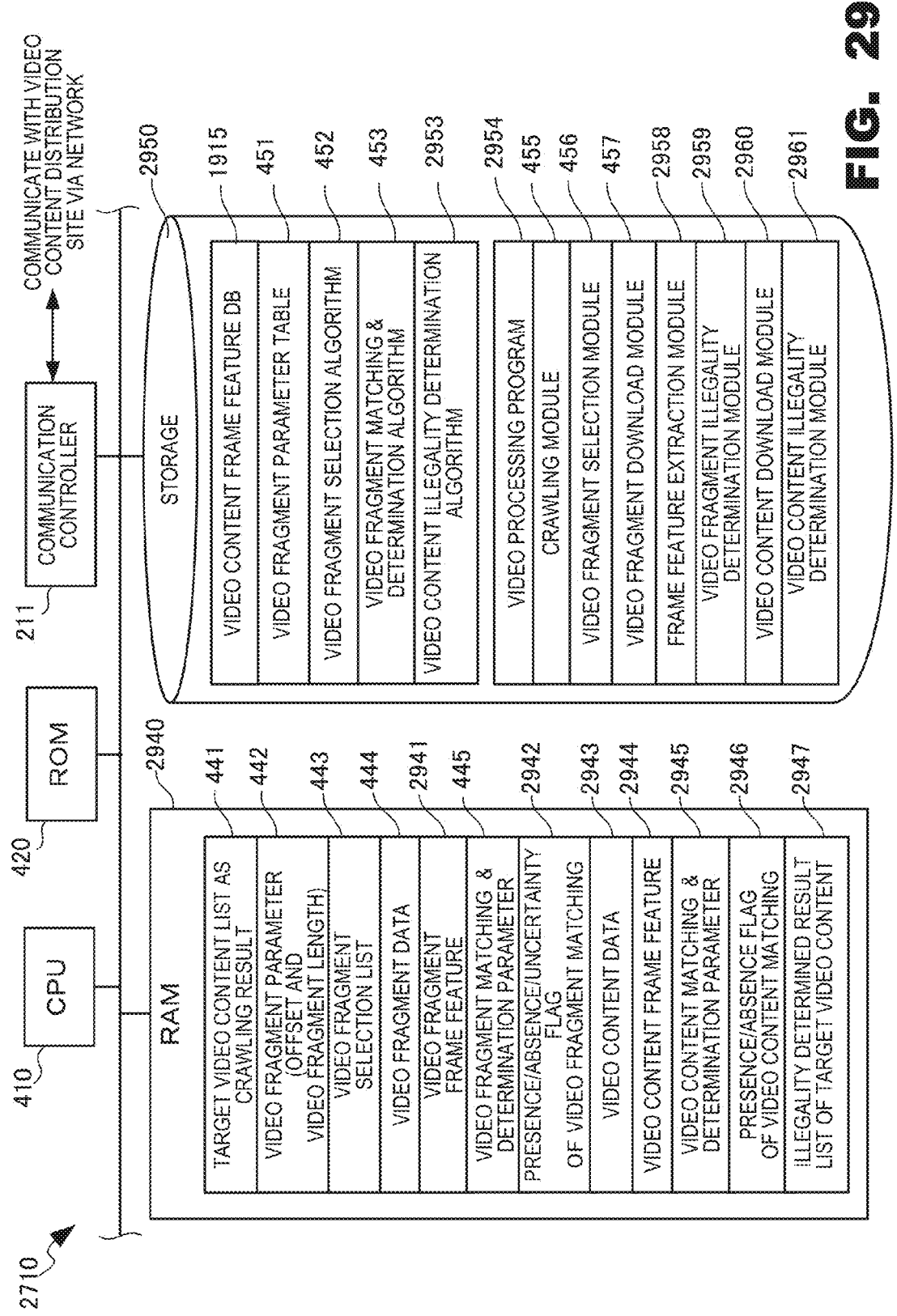
FIG. 29 is a block diagram showing the hardware arrangement of a video processing apparatus according to the eighth embodiment of the present invention.

FIG. 29 is a block diagram showing the hardware arrangement of a video processing apparatus 2710 according to this embodiment. Points of difference between the video processing apparatus 2710 shown in FIG. 29 and the video processing apparatus 210 shown in FIG. 4 will be described below. Note that the same reference numerals as in FIG. 4 denote the same components, and a description thereof will be omitted.

A RAM 2940 stores a video fragment frame feature 2941 that is a frame feature extracted from downloaded video fragment data. The RAM also stores a presence/absence/uncertainty flag 2942 of video fragment matching, representing the result of comparison/determination using the video fragments. In this embodiment, if the presence/absence/uncertainty flag 2942 of video fragment matching represents uncertainty, the video content is downloaded and compared/determined. The RAM also stores downloaded video content data 2943. The RAM also stores a video content frame feature 2944 extracted from the downloaded video content data. The RAM also stores a video content matching and determination parameter 2945 used to determine matching by comparing the video contents. The RAM also stores a presence/absence flag 2946 of video content matching, representing whether the video contents match with each other. The RAM also stores an illegality determined result list 2947 of target video content, representing illegality determined based on the presence/absence of video fragment matching and the presence/absence of video content matching (see FIG. 30).

A storage 2950 stores the video content frame feature DB 1915. The storage also stores a video content illegality determination algorithm 2953 that is an algorithm to judge illegality of a video content. The storage also stores a video processing program 2954 according to this embodiment (see FIG. 31). The storage also stores a frame feature extraction module 2958 that is included in the video processing program 2954 and extracts frame features from the downloaded video fragments and video contents. The storage also stores a video fragment illegality determination module 2959 that is included in the video processing program 2954 and determines illegality from the video fragments. The storage also stores a video content download module 2960 that is included in the video processing program 2954 and downloads video contents. The storage also stores a video content illegality determination module 2961 that is included in the video processing program 2954 and determines illegality from the video contents. Note that FIG. 29 illustrates the data and programs indispensable in this embodiment but not general-purpose data and programs such as the OS.

(Arrangement of Target Video Content Illegality Determined Result List)

FIG. 30 is a view showing the arrangement of the target video content illegality determined result list 2947 according to this embodiment.

The target video content illegality determined result list 2947 shown in FIG. 30 stores the following data in association with a video content ID 3001 of an illegality determination target video content. Reference numeral 3002 denotes a frame feature extracted from the video content; 3003, a matching/unmatching result by video content comparison; 3004, an SN (serial number) of a selected video fragment; 3005, a frame feature extracted from the video fragment; 3006, a determined result by the comparison result of frame features of video fragments; 3007, a similar associated video content or scene; 3008, a matching/uncertainty/unmatching result by video fragment comparison; 3009, an illegality presence/absence result determined from the results of video content matching/unmatching and video fragment matching/uncertainty/unmatching.

In a video content having a video content ID "1001", matching with a known video content or scene is obtained by video fragment comparison. Hence, it is determined that illegality exists without download and comparison/determination of the video content. On the other hand, in a video content having a video content ID "2010", whether to match is uncertain upon video fragment comparison. Hence, download and comparison/determination of the video content are performed. Since no matching is obtained by video content comparison, it is determined that illegality does not exist.

<Processing Procedure of Video Processing Apparatus>

Figure 31:
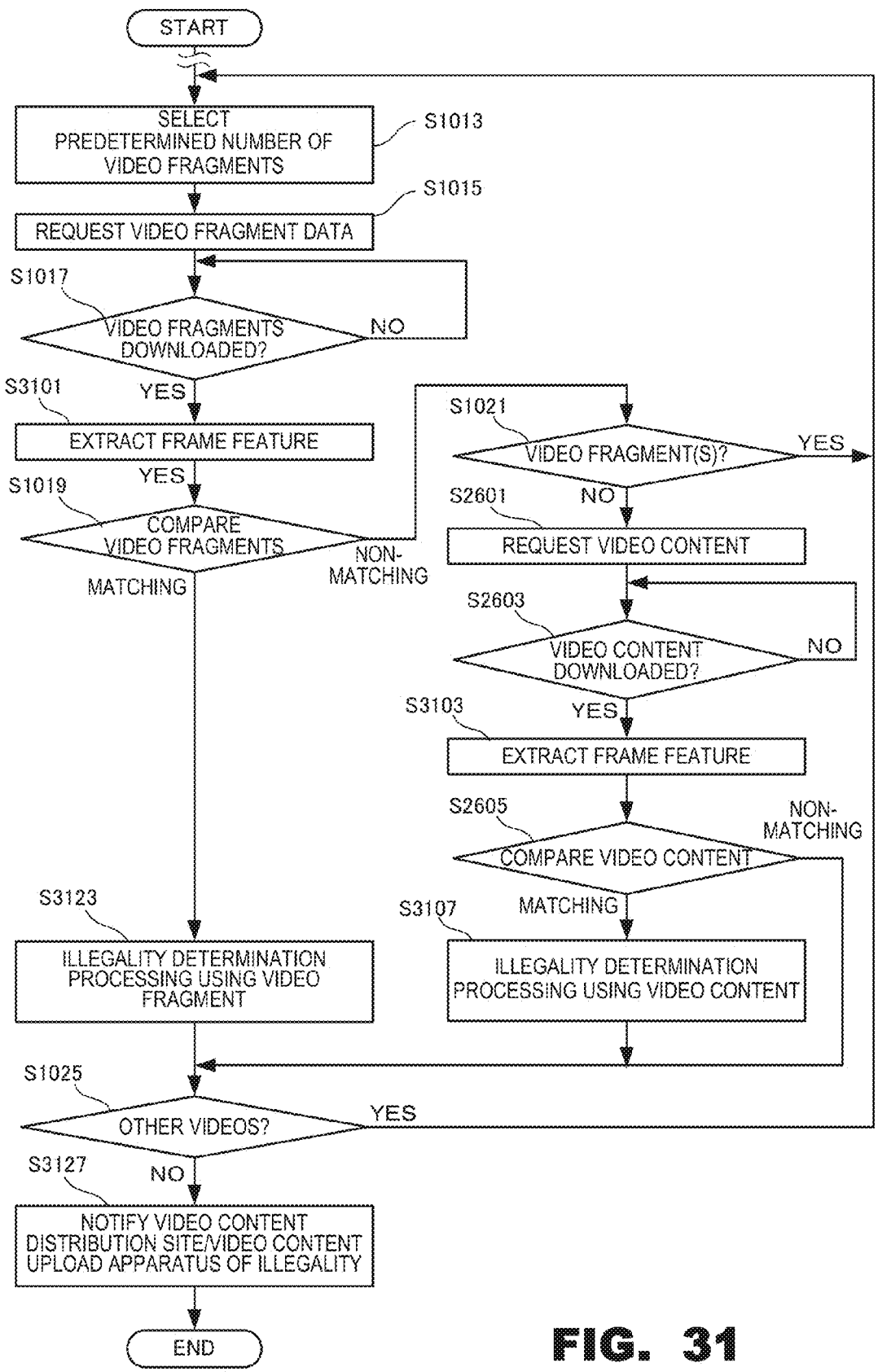
FIG. 31 is a flowchart showing the processing procedure of the video processing apparatus according to the eighth embodiment of the present invention.

FIG. 31 is a flowchart showing the processing procedure of the video processing apparatus 2710 according to the eighth embodiment. A CPU 410 shown in FIG. 27 executes this flowchart using the RAM 2940, thereby implementing the functional components shown in FIG. 27. Note that the same reference numerals as in FIG. 26 denote the same steps in FIG. 31, and a description thereof will be omitted.

In step S3101, frame features are extracted from the downloaded video fragments. In step S3103, frame features are extracted from the downloaded video content.

If the video fragments match the video content upon comparing the frame features of the video fragments with the frame features in the video content frame feature DB in step S1019, illegality determination processing using the video fragments is performed in step S3123. If the downloaded video content matches the video content in the video content frame feature DB upon comparing the frame features of the downloaded video content with the frame features in the video content frame feature DB in step S2605, illegality determination processing using the video content is performed in step S3107.

Finally in step S3127, the video content distribution site or the video content upload apparatus is notified of the illegal video content to call attention.

Note that in the eighth embodiment, if each video content distribution site or video content upload apparatus includes the frame feature extractor, the channel capacity of the network can be reduced.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. The present invention also incorporates a system or apparatus that somehow combines different features included in the respective embodiments.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the control program installed in a computer to implement the functions of the present invention on the computer, a medium storing the control program, and a WWW (World Wide Web) server that causes a user to download the control program.

This application claims the benefit of Japanese Patent Application No. 2011-067641 filed on Mar. 25, 2011, which is hereby incorporated by reference herein in its entirety.

What is claimed is:

1. A video processing system comprising:
   a video fragment download unit, implemented at least in hardware including a processor and memory, that downloads, via a network, data of video fragments, each selected without consideration of video scene and including a series of a plurality of frames, in a target video content to be determined; and a first video content determination unit, implemented at least in the hardware, that determines the target video content based on the downloaded data of the video fragments, wherein said video fragment download unit comprises an algorithm storage that stores a plurality of different algorithms in association with a type of the video content as the determination target of said first video content determination unit, and selects the video fragments to be downloaded from the video content using an algorithm corresponding to the type of the video content as the determination target of said first video content determination unit, and said first video content determination unit determines, based on comparison between a series of frame features, each extracted from each frame of a video fragment, and a series of frame features of a video content registered in advance, whether a video scene including the video fragments matches a video scene of the video content registered in advance or whether a video content including the video fragments matches the video content registered in advance.

2. The video processing system according to claim 1, further comprising a first illegality determination unit that determines that the video content including the video fragments has illegality, when said first video content determination unit has determined that the video scene including the video fragments matches the video scene of the video content registered in advance or that the video content including the video fragments matches the video content registered in advance.

3. The video processing system according to claim 2, further comprising a second determined result notification unit that notifies a video content distribution site having the video content or an upload source that has uploaded the video content to the video content distribution site, of a determined result by said first illegality determination unit.

4. The video processing system according to claim 1, further comprising a video content selector that selects, from video contents uploaded to a video content distribution site, the target video content to be determined including the data of the video fragments to be downloaded by said video fragment download unit.

5. The video processing system according to claim 4, wherein said video content selector includes a video content crawler that crawls the video content uploaded to the video content distribution site.

6. The video processing system according to claim 1, further comprising:
a content download unit, implemented at least in the hardware, that downloads data of a whole video content when it is judged to be necessary to more accurately determine details of the video content from a determined result of said first video content determination unit; and
a second video content determination unit, implemented at least in the hardware, that determines the details of the video content from the downloaded data of the whole video content.

7. The video processing system according to claim 4, wherein said second video content determination unit determines a level of matching between the whole video content and the video content registered in advance or between the whole video content and the video scene of the video content registered in advance, based on comparison between a series of frame features extracted from the whole video content and the series of frame features of the video content registered in advance.

8. The video processing system according to claim 7, further comprising a video content distribution site distributing the video content having a frame feature extractor that extracts frame feature, wherein the series of frame features of the whole video content are downloaded from the video content distribution site via the network.

9. The video processing system according to claim 7, wherein the frame feature is data obtained by combining differences as many as a number of region pairs on each frame, each of the differences being a difference between a pair of region features calculated for each of the region pairs, each region of the each of the region pairs formed on the each frame in different sizes.

10. The video processing system according to claim 9, wherein the region features are represented by a luminance.

11. The video processing system according to claim 6, further comprising a second illegality determination unit that determines that the video content has illegality, when said second video content determination unit has determined that the level of matching between the whole video content and the video content registered in advance or between the whole video content and the video scene of the video content registered in advance satisfies a predetermined condition.

12. The video processing system according to claim 11, further comprising a fourth determined result notification unit, implemented at least in the hardware, that notifies the video content distribution site having the video content or an upload source that has uploaded the video content to the video content distribution site, of a determined result by said second illegality determination unit.

13. The video processing system according to claim 6, further comprising a third determined result notification unit that notifies a video content distribution site having the video content or an upload source that has uploaded the video content to the video content distribution site, of a determined result by said second video content determination unit.

14. The video processing system according to claim 1, further comprising a video content distribution site distributing the video content having a frame feature extractor that extracts frame feature, wherein the series of frame features of the video fragments are downloaded from the video content distribution site via the network.

15. The video processing system according to claim 1, wherein the frame feature is data obtained by combining differences as many as a number of region pairs on each frame, each of the differences being a difference between a pair of region features calculated for each of the region pairs, each region of the each of the region pairs formed on the each frame in different sizes.

16. The video processing system according to claim 15, wherein the region features are represented by a luminance.

17. The video processing system according to claim 1, further comprising a controller that controls a processing procedure by said video fragment download unit and said first video content determination unit when determining a plurality of video contents, wherein said controller controls repeating download by said video fragment download unit and determination by said first video content determination unit for a predetermined number of video fragments of each video contents, but stopping the subsequent download and determination for the each video contents when the determination by said first video content determination unit has been established.

18. The video processing system according to claim 1, further comprising a controller that controls a processing procedure by said video fragment download unit and said first video content determination unit when determining a plurality of video contents,
wherein said controller controls sequentially performing download by said video fragment download unit and determination by said first video content determination unit for all selected video fragments of each video contents, but stopping the subsequent download and determination when the determination by said first video content determination unit has been established, and then proceeding a process for a next video content.

19. The video processing system according to claim 1, further comprising a first determined result notification unit notifies one of a video content distribution site having the video content and an upload source that has uploaded the video content to the video content distribution site of a determined result by said first video content determination unit.

20. The video processing system according to claim 1, wherein said video fragment download unit comprises a video fragment setting unit that sets a number of video fragments to be downloaded and a time length of each video fragment in consideration of a determination speed and a determination accuracy of said first video content determination unit.

21. The video processing system according to claim 1, wherein said video fragment download unit selects the video fragments using a different algorithm stored in said algorithm storage in accordance with the determined result of said first video content determination unit.

22. The video processing system according to claim 1, wherein the algorithms include an algorithm that segments the video content into a predetermined number of partial video contents and selects the video fragment from each segmented partial video content.

23. The video processing system according to claim 22, wherein the algorithm selects the partial video content including the video fragment to be downloaded from the segmented partial video contents at random.

24. The video processing system according to claim 22, wherein the algorithms include an algorithm that selects the video fragment at a position offset from a start or an end of the segmented partial video content.

25. The video processing system according to claim 1, wherein the algorithms include an algorithm that segments the video content at a predetermined time interval and selects the video fragment from each segmented partial video content.

26. The video processing system according to claim 25, wherein the algorithm selects the partial video content including the video fragment to be downloaded from the segmented partial video contents at random.

27. The video processing system according to claim 25, wherein the algorithms include an algorithm that selects the video fragment at a position offset from a start or an end of the segmented partial video content.

28. The video processing system according to claim 1, wherein the algorithms include an algorithm that selects the video fragment based on information about the video content.

29. The video processing system according to claim 1, wherein the algorithms include an algorithm that prohibits selection of the video fragment within the video content for a predetermined time from the start or the end of the video content.

30. The video processing system according to claim 1, wherein the algorithms include an algorithm that prohibits selection of the video fragment within the video content for a predetermined time corresponding to the type of the video content.

31. A video content monitoring method comprising:
selecting a target video content which should be determined from video contents uploaded to a video content distribution site;
downloading data of video fragments, each selected without consideration of video scene and including a series of a plurality of frames in the selected video content via a network; and
determining, based on comparison between a series of frame features, each extracted from each frame of a video fragment, and a series of frame features of a video content registered in advance, whether a video scene formed a series of a plurality of frames including the video fragments matches a video scene of the video content registered in advance or whether a video content including the video fragments matches the video content registered in advance,
wherein, in said downloading step, with referring to an algorithm storage that stores a plurality of different algorithms in association with a type of the video content as the determination target in said determining step, the video fragments to be downloaded from the video content is selected using an algorithm corresponding to the type of the video content as the determination target in said determining step.

32. A video processing apparatus comprising:
a video content selector, implemented at least in hardware including a processor and memory, that selects a video content which should be determined from video contents uploaded to a video content distribution site;
a video fragment download unit, implemented at least in the hardware, that downloads data of video fragments, each selected without consideration of video scene and including a series of a plurality of frames in the selected video content via a network; and
a video content determination unit, implemented at least in the hardware, that determines the video content based on the downloaded data of the video fragments,
wherein said video fragment download unit comprises an algorithm storage that stores a plurality of different algorithms in association with a type of the video content as the determination target of said first video content determination unit, and selects the video fragments to be downloaded from the video content using an algorithm corresponding to the type of the video content as the determination target of said first video content determination unit, and
said video content determination unit determines, based on comparison between a series of frame features, each extracted from each frame of a video fragment, and a series of frame features of a video content registered in advance, whether a video scene including the video fragments matches a video scene of the video content registered in advance or whether a video content including the video fragments matches the video content registered in advance.

33. A control method of a video processing apparatus comprising:

selecting a video content which should be determined from video contents uploaded to a video content distribution site;

downloading data of a video fragments, each selected without consideration of video scene and including a series of a plurality of frames in the selected video content via a network; and determining the video content based on the downloaded data of the video fragments, wherein, in said downloading step, with referring to an algorithm storage that stores a plurality of different algorithms in association with a type of the video content as the determination target in said determining step, the video fragments to be downloaded from the video content is selected using an algorithm corresponding to the type of the video content as the determination target in said determining step, and, in said determining step, it is determined, based on comparison between a series of frame features, each extracted from each frame of a video fragment, and a series of frame features of a video content registered in advance, whether a video scene including the video fragments matches a video scene of the video content registered in advance or whether a video content including the video fragments matches the video content registered in advance.

34. A non-transitory computer-readable storage medium storing a control program of a video processing apparatus, the control program causing a computer to execute the steps of:

selecting a video content which should be determined from video contents uploaded to a video content distribution site;

downloading data of a video fragments, each selected without consideration of video scene and including a series of a plurality of frames in the selected video content via a network; and determining the video content based on the downloaded data of the video fragments, wherein, in said downloading step, with referring to an algorithm storage that stores a plurality of different algorithms in association with a type of the video content as the determination target in said determining step, the video fragments to be downloaded from the video content is selected using an algorithm corresponding to the type of the video content as the determination target in said determining step, and, in said determining step, it is determined, based on comparison between a series of frame features, each extracted from each frame of a video fragment, and a series of frame features of a video content registered in advance, whether a video scene including the video fragments matches a video scene of the video content registered in advance or whether a video content including the video fragments matches the video content registered in advance.

* * * * *